(12) United States Patent
Ishihara et al.

(10) Patent No.: US 8,866,848 B2
(45) Date of Patent: Oct. 21, 2014

(54) IMAGE PROCESSING DEVICE, CONTROL METHOD FOR AN IMAGE PROCESSING DEVICE, PROGRAM, AND INFORMATION STORAGE MEDIUM

(75) Inventors: Akihiro Ishihara, Taito-ku (JP);
Kazuhiro Ogawa, Hachioji (JP);
Kazuya Matsumoto, Yokohama (JP);
Yoshihiko Narita, Meguro-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 32 days.

(21) Appl. No.: 13/883,429

(22) PCT Filed: Apr. 25, 2012

(86) PCT No.: PCT/JP2012/061141
§ 371 (c)(1),
(2), (4) Date: May 3, 2013

(87) PCT Pub. No.: WO2013/001902
PCT Pub. Date: Jan. 3, 2013

(65) Prior Publication Data
US 2013/0222647 A1 Aug. 29, 2013

(30) Foreign Application Priority Data
Jun. 27, 2011 (JP) ................................. 2011-141890

(51) Int. Cl.
*G09G 5/00* (2006.01)
(Continued)

(52) U.S. Cl.
CPC ............. *H04N 5/2621* (2013.01); *H04N 5/272* (2013.01); *G06T 15/503* (2013.01); *G06T 19/006* (2013.01)
USPC ........... 345/633; 345/619; 345/629; 345/632; 348/207.1; 348/222.1; 348/239; 348/333.12; 463/30; 463/34

(58) Field of Classification Search
USPC ........... 348/207.1, 222.1, 231.99–231.9, 239, 348/333.01–333.13; 345/418–428, 345/619–641; 463/30–34
See application file for complete search history.

(56) References Cited

U.S. PATENT DOCUMENTS 5,914,748 A * 6/1999 Parulski et al. ............... 348/239
6,101,289 A * 8/2000 Kellner ......................... 382/276
(Continued)

FOREIGN PATENT DOCUMENTS

JP 08-227464 A 9/1996
JP 11-250273 A 9/1999
(Continued)

OTHER PUBLICATIONS

Office Action issued in corresponding Japanese Patent Application No. 2011-141890 dated May 22, 2012.
(Continued)

*Primary Examiner* — Michael Osinski
(74) *Attorney, Agent, or Firm* — Sughrue Mion, PLLC

(57) ABSTRACT

Background object disposing means (88) disposes a background object (74) representing a background, which is photographed outside a target region (62) of a photographed image (60), on a virtual space (70). Subject object disposing means (90) disposes a subject object (74) between a viewpoint (72) and the background object (76) so that a position at which the subject object (76) is displayed to be superimposed on the background object (74) in a virtual space image (64), and a position of the target region (62) in the photographed image (60), correspond to each other. Composition target object disposing means (92) disposes a composition target object (78) representing a composition target, which is to be displayed to be combined with a real-world space (70) in the virtual space image (64), between the background object (74) and the subject object (76).

10 Claims, 14 Drawing Sheets

(51) Int. Cl.

| | | |
|---|---|---|
| *H04N 5/225* | (2006.01) | |
| *H04N 5/228* | (2006.01) | |
| *H04N 5/262* | (2006.01) | |
| *H04N 5/222* | (2006.01) | |
| *A63F 9/24* | (2006.01) | |
| *A63F 13/00* | (2014.01) | |
| *G06F 17/00* | (2006.01) | |
| *G06F 19/00* | (2011.01) | |
| *H04N 5/272* | (2006.01) | |
| *G06T 15/50* | (2011.01) | |
| *G06T 19/00* | (2011.01) | |

(56) References Cited

U.S. PATENT DOCUMENTS

| | | | | |
|---|---|---|---|---|
| 6,166,744 | A * | 12/2000 | Jaszlics et al. | 345/629 |
| 6,621,524 | B1 * | 9/2003 | Iijima et al. | 348/584 |
| 6,822,643 | B2 * | 11/2004 | Matsui et al. | 345/204 |
| 7,298,384 | B2 * | 11/2007 | Anabuki et al. | 345/633 |
| 7,574,070 | B2 * | 8/2009 | Tanimura et al. | 382/284 |
| 7,876,334 | B2 * | 1/2011 | Bychkov et al. | 345/629 |
| 8,072,470 | B2 * | 12/2011 | Marks | 345/632 |
| 8,303,411 | B2 * | 11/2012 | Marks et al. | 463/36 |
| 8,432,476 | B2 * | 4/2013 | Ashforth et al. | 348/333.12 |
| 8,547,401 | B2 * | 10/2013 | Mallinson et al. | 345/633 |
| 8,687,021 | B2 * | 4/2014 | Bathiche et al. | 345/633 |
| 8,767,096 | B2 * | 7/2014 | Horii | 348/239 |
| 2002/0059648 | A1 * | 5/2002 | Ohba et al. | 725/153 |
| 2002/0075286 | A1 * | 6/2002 | Yonezawa et al. | 345/679 |
| 2003/0185461 | A1 * | 10/2003 | Ohshima | 382/284 |
| 2004/0189823 | A1 * | 9/2004 | Shibutani | 348/231.1 |
| 2005/0068314 | A1 * | 3/2005 | Aso et al. | 345/419 |
| 2005/0152002 | A1 * | 7/2005 | Shirakawa et al. | 358/1.18 |
| 2005/0212817 | A1 * | 9/2005 | Cannon et al. | 345/619 |
| 2006/0038833 | A1 * | 2/2006 | Mallinson et al. | 345/633 |
| 2006/0073892 | A1 * | 4/2006 | Watanabe et al. | 463/34 |
| 2006/0079324 | A1 * | 4/2006 | Watanabe et al. | 463/30 |
| 2007/0098238 | A1 * | 5/2007 | Obrador | 382/128 |
| 2007/0248283 | A1 * | 10/2007 | Mack et al. | 382/284 |
| 2007/0260985 | A1 * | 11/2007 | Utagawa et al. | 715/721 |
| 2008/0074424 | A1 * | 3/2008 | Carignano | 345/473 |
| 2009/0153550 | A1 * | 6/2009 | Keaney et al. | 345/419 |
| 2009/0195538 | A1 * | 8/2009 | Ryu et al. | 345/419 |
| 2010/0091036 | A1 * | 4/2010 | Wright et al. | 345/633 |
| 2010/0160050 | A1 | 6/2010 | Oku | |
| 2011/0025885 | A1 * | 2/2011 | Minami | 348/231.3 |
| 2011/0149117 | A1 * | 6/2011 | Vendrig | 348/239 |
| 2011/0176010 | A1 * | 7/2011 | Houjou et al. | 348/207.1 |
| 2011/0216206 | A1 * | 9/2011 | Ashforth et al. | 348/207.1 |
| 2012/0057051 | A1 * | 3/2012 | Ito et al. | 348/239 |
| 2012/0094773 | A1 * | 4/2012 | Suzuki | 463/43 |
| 2012/0105676 | A1 * | 5/2012 | Park | 348/231.3 |
| 2012/0242865 | A1 * | 9/2012 | Vartanian et al. | 348/239 |
| 2013/0094780 | A1 * | 4/2013 | Tang et al. | 382/284 |
| 2013/0307875 | A1 * | 11/2013 | Anderson | 345/633 |
| 2014/0009476 | A1 * | 1/2014 | Venkitaraman et al. | 345/502 |
| 2014/0180972 | A1 * | 6/2014 | Boldyrev et al. | 706/12 |

FOREIGN PATENT DOCUMENTS

| | | |
|---|---|---|
| JP | 2000-325584 A | 11/2000 |
| JP | 2005-196613 A | 7/2005 |
| JP | 2010-142592 A | 7/2010 |

OTHER PUBLICATIONS

International Preliminary Report on Patentability issued in corresponding PCT/JP2012/061141 dated Jan. 16, 2014.

* cited by examiner

FIG.16

| VIRTUAL SPACE | MOTION DATA |
|---|---|
| TARGET REGION A | MOTION DATA A<br>(CHARACTER APPEARS FROM BEHIND TREE AND APPROACHES) |
| TARGET REGION B | MOTION DATA B<br>(SIT ON CHAIR BEHIND DESK) |
| ⋮ | ⋮ |

FIG.17

| SUBJECT | MOTION DATA |
|---|---|
| TREE | MOTION DATA A<br>(CHARACTER APPEARS FROM BEHIND TREE AND APPROACHES) |
| DESK | MOTION DATA B<br>(SIT ON CHAIR BEHIND DESK) |
| ⋮ | ⋮ | ically been known a technology of
IMAGE PROCESSING DEVICE, CONTROL METHOD FOR AN IMAGE PROCESSING DEVICE, PROGRAM, AND INFORMATION STORAGE MEDIUM

CROSS REFERENCE TO RELATED APPLICATIONS

This application is a National Stage of International Application No. PCT/JP2012/061141 filed Apr. 25, 2012, claiming priority based on Japanese Patent Application No. 2011-141890 filed Jun. 27, 2011, the contents of all of which are incorporated herein by reference in their entirety.

TECHNICAL FIELD

The present invention relates to an image processing device, a control method for an image processing device, a program, and an information storage medium.

BACKGROUND ART

There has conventionally been known a technology of providing augmented reality (AR) to a user by superimposing an image obtained by photographing a real-world space with a camera and an image of a virtual space as viewed from a given viewpoint, and displaying the superimposed images on a screen. For example, Patent Literature 1 describes a technology of providing the augmented reality by superimposing an image of the virtual space in which an object representing glasses is disposed as viewed from the given viewpoint and an image obtained by photographing the face of the user.

CITATION LIST

Patent Literature

Patent Literature 1: JP 2010-142592 A

SUMMARY OF INVENTION

Technical Problems

However, in the augmented reality provided by the technology of Patent Literature 1, the image representing the virtual space is displayed by being superimposed on the image representing the real-world space. Therefore, for example, display control such that a character appears from behind (the back side of) an object disposed in the real-world space cannot be performed, and hence the composite image may not be sufficiently realistic.

In order to make the augmented reality more realistic, there has been study into the technology relating to Parallel Tracking and Mapping (PTAM) involving extracting feature points from the image obtained by photographing the real-world space and thereby generating a three-dimensional space simulating the real-world space. However, the PTAM technology has had a problem of requiring complex processing and increasing the processing load of an image processing device.

The present invention has been made in view of the above-mentioned problems, and therefore has an object to provide an image processing device capable of providing realistic augmented reality while reducing a processing load of an image processing device, a control method for an image processing device, a program, and an information storage medium.

Solution to Problems

In order to solve the above-mentioned problems, according to the present invention, there is provided an image processing device, including: image acquiring means for acquiring a photographed image of a real-world space from photographing means for photographing the real-world space; display control means for causing a virtual space image representing a situation of a virtual space as viewed from a given viewpoint to be displayed on display means; target region setting means for setting a target region in the photographed image; background object disposing means for disposing a background object representing a background, which is photographed outside the target region of the photographed image, in the virtual space; subject object disposing means for disposing a subject object representing a subject, which is photographed inside the target region of the photographed image, in the virtual space, the subject object disposing means disposing the subject object between the given viewpoint and the background object so that a position at which the subject object is displayed to be superimposed on the background object in the virtual space image, and a position of the target region in the photographed image, correspond to each other; and composition target object disposing means for disposing a composition target object, which represents a composition target to be displayed to be combined with the real-world space in the virtual space image, between the background object and the subject object, in which, in the virtual space image, the display control means displays the composition target object to be superimposed on the background object, and displays the subject object to be superimposed on the composition target object.

According to the present invention, there is also provided a control method for an image processing device, including: an image acquiring step of acquiring a photographed image of a real-world space from photographing means for photographing the real-world space; a display control step of causing a virtual space image representing a situation of a virtual space as viewed from a given viewpoint to be displayed on display means; a target region setting step of setting a target region in the photographed image; a background object disposing step of disposing a background object representing a background, which is photographed outside the target region of the photographed image, in the virtual space; a subject object disposing step of disposing a subject object representing a subject, which is photographed inside the target region of the photographed image, in the virtual space, the subject object disposing step including disposing the subject object between the given viewpoint and the background object so that a position at which the subject object is displayed to be superimposed on the background object in the virtual space image, and a position of the target region in the photographed image, correspond to each other; and a composition target object disposing step of disposing a composition target object, which represents a composition target to be displayed to be combined with the real-world space in the virtual space image, between the background object and the subject object, in which the display control step includes, in the virtual space image, displaying the composition target object to be superimposed on the background object, and displaying the subject object to be superimposed on the composition target object.

According to the present invention, there is also provided a program for causing a computer to function as an image processing device, the image processing device including: image acquiring means for acquiring a photographed image of a real-world space from photographing means for photographing the real-world space; display control means for causing a virtual space image representing a situation of a virtual space as viewed from a given viewpoint to be displayed on display means; target region setting means for setting a target region in the photographed image; background object disposing means for disposing a background object representing a background, which is photographed outside the target region of the photographed image, in the virtual space; subject object disposing means for disposing a subject object representing a subject, which is photographed inside the target region of the photographed image, in the virtual space, the subject object disposing means disposing the subject object between the given viewpoint and the background object so that a position at which the subject object is displayed to be superimposed on the background object in the virtual space image, and a position of the target region in the photographed image, correspond to each other; and composition target object disposing means for disposing a composition target object, which represents a composition target to be displayed to be combined with the real-world space in the virtual space image, between the background object and the subject object, in which, in the virtual space image, the display control means displays the composition target object to be superimposed on the background object, and displays the subject object to be superimposed on the composition target object.

According to the present invention, there is also provided a non-transitory computer-readable information storage medium having the above-mentioned program stored thereon.

According to the present invention, it is possible to provide realistic augmented reality while reducing a processing load of the image processing device.

Further, in an aspect of the present invention, the image acquiring means acquires, in a case where a photographing instruction operation is performed by the user, the photographed image from the photographing means, the image processing device further includes guiding means for causing a pre-photographing image representing the real-world space, which is acquired from the photographing means before the photographing instruction operation is performed by the user, to be displayed on the display means, and guiding, in the pre-photographing image, the user to the target region set in the photographed image, and the image acquiring means acquires, in a case where the user is guided to the target region and then performs the photographing instruction operation, the photographed image from the photographing means.

Further, in an aspect of the present invention, the image processing device further includes: means for allowing the user to perform a changing instruction operation for a shape or the position of the target region set in the photographed image; and means for changing, in a case where the changing instruction operation is performed by the user, the shape or the position of the target region based on the changing instruction operation, the subject object disposing means determines, based on the changed shape or position of the target region, a shape or the position of the subject object, and the composition target object disposing means determines a position or an action of the composition target object so that all or a portion of the composition target object is hidden by the determined subject object as viewed from the given viewpoint.

Further, in an aspect of the present invention, the subject object includes a translucent polygon, the image processing device further includes means for making the translucent polygon representing a portion of the subject object that is photographed in a predetermined region in the target region transmissive, and the display control means causes a portion of the composition target object, on which the transmissive translucent polygon is superimposed as viewed from the given viewpoint, to be displayed in the virtual space image.

Further, in an aspect of the present invention, the image processing device further includes means for acquiring motion data defining an action of the composition target object from means for storing the virtual space and the motion data in association with each other, and, based on the motion data associated with the virtual space generated by the display control means, the composition target object disposing means causes the composition target object to act in the virtual space.

Further, in an aspect of the present invention, the image processing device further includes: means for guiding the user to the subject to be photographed in the target region; and means for acquiring motion data defining an action of the composition target object from means for storing the subject and the motion data in association with each other, and, based on the motion data associated with the subject to which the user is guided, the composition target object disposing means causes the composition target object to act in the virtual space.

BRIEF DESCRIPTION OF DRAWINGS

FIG. 16 A table showing a data storage example of motion data.

FIG. 17 A table showing association between subjects and the motion data.

DESCRIPTION OF EMBODIMENT

1. Embodiment

A detailed description is given below of an embodiment of the present invention, with reference to the drawings. An image processing device according to the present invention is implemented by using, for example, portable terminals such as a portable game machine and a cellular phone, or various types of computer such as a personal computer. Herein, a description is given of a case where an image processing device according to the embodiment of the present invention is implemented by using a portable game machine.

(1-1. Hardware Configuration of Game Device)

Figure 1:
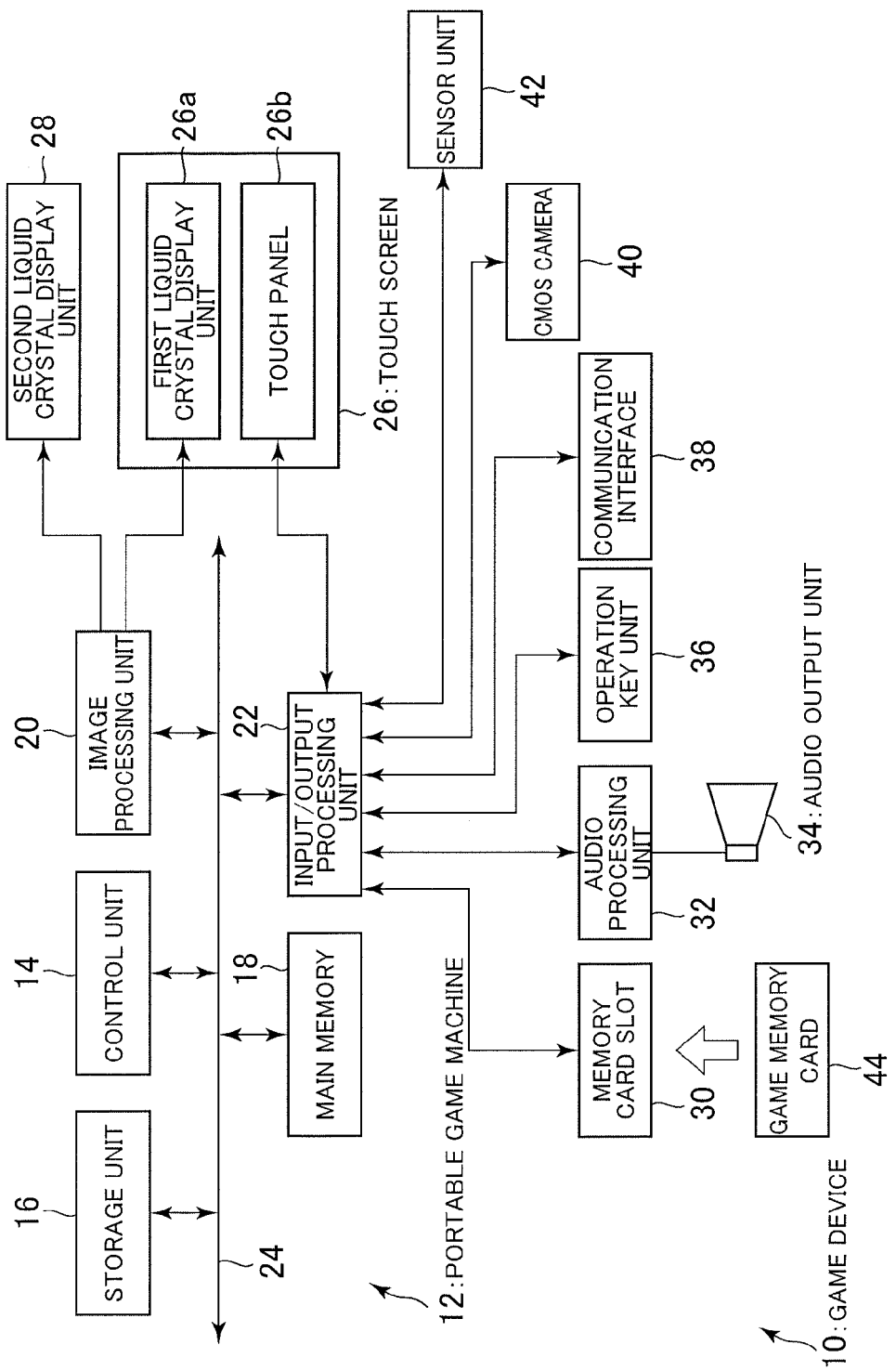
FIG. 1 A diagram illustrating a hardware configuration of a game device according to an embodiment of the present invention.

FIG. 1 is a diagram illustrating a hardware configuration of a game device 10 according to the embodiment of the present invention. As illustrated in FIG. 1, the game device 10 includes a portable game machine 12 and a game memory card 44. The portable game machine 12 includes a control unit 14, a storage unit 16, a main memory 18, an image processing unit 20, an input/output processing unit 22, a bus 24, a touch screen 26 (first liquid crystal display unit 26a and touch panel 26b), a second liquid crystal display unit 28, a memory card slot 30, an audio processing unit 32, an audio output unit 34, an operation key unit 36, a communication interface 38, a CMOS camera 40, and a sensor unit 42.

The control unit 14 controls the components of the game device 10 based on an operating system which is stored in the storage unit 16, and on a program and various types of data which are stored in the game memory card 44. The storage unit 16 includes a non-volatile storage medium such as a flash memory. The storage unit 16 stores the operating system and the like.

The main memory 18 includes, for example, a RAM. A program read out of the game memory card 44 via the memory card slot 30 is written into the main memory 18 as the need arises. The main memory 18 is also used as a work memory of the control unit 14.

The bus 24 is used to exchange addresses and various types of data between the components of the game device 10. The control unit 14, the main memory 18, the image processing unit 20, and the input/output processing unit 22 are connected to one another by the bus 24 in a manner that allows those components to communicate data between one another.

The image processing unit 20 includes a VRAM. The image processing unit 20 renders an image in the VRAM in accordance with an instruction from the control unit 14. The image rendered in the VRAM is displayed on the first liquid crystal display unit 26a and the second liquid crystal display unit 28 at a predetermined timing. The first liquid crystal display unit 26a and the second liquid crystal display unit 28 are, for example, known liquid crystal display panels.

The input/output processing unit 22 is an interface by which the control unit 14 exchanges various kinds of data with the touch panel 26b, the memory card slot 30, the audio processing unit 32, the operation key unit 36, the communication interface 38, the CMOS camera 40, and the sensor unit.

The operation key unit 36 functions as input means by which a user performs an operation. The operation key unit 36 includes, for example, the cross-shaped button, the slide pad, and various types of buttons. The input/output processing unit 22 scans the state of each part of the operation key unit 36 every predetermined cycle (e.g., every $\frac{1}{60}^{th}$ of a second), and supplies an operation signal representing the scanning result to the control unit 14 via the bus 24. The control unit 14 determines details of the user operation based on the operation signal.

The touch panel 26b functions as input means in the same manner as the operation key unit 36 with which the user performs an operation. The touch panel 26b supplies touched position information corresponding to a position touched (pressed) by the user or by an object (touch pen) that the user holds to the control unit 14 via the input/output processing unit 22.

The memory card slot 30 reads a game program and game data stored in the game memory card 44 in accordance with an instruction issued from the control unit 14. The game memory card 44 includes, for example, a ROM in which the game program and the game data such as image data are stored, and an EEPROM in which the game data such as save data is stored.

Note that in this embodiment, the description is given by taking an example in which the game memory card 44 is used in order to supply the program and the data to the game device 10, but another information storage medium such as an optical disc may be used. In addition, the program and the data may be supplied to the game device 10 from a remote site via a communication network such as the Internet. Alternatively, various data communications such as infrared communications may be used to supply the program and the data to the game device 10.

The audio processing unit 32 includes a sound buffer. The audio processing unit 32 outputs a music track or audio from the audio output unit 34 based on data for output of the music track or audio data stored in the sound buffer. The communication interface 38 is an interface for connecting the game device 10 to the communication network.

The CMOS camera 40 photographs a real-world space. Note that in this embodiment, a description is given of a case where the real-world space is photographed by the CMOS camera 40, but the real-world space may be photographed by another image pickup element (for example, CCD camera). The sensor unit 42 includes a gyro sensor, a motion sensor, and the like. A detection signal from the sensor unit 42 is input to the control unit 14 via the input/output processing unit 22.

(1-2. Augmented Reality Provided to User)

The game device 10 provides augmented reality to the user by causing, based on an image (hereinafter referred to as photographed image) representing the real-world space photographed by the CMOS camera 40, such an image that an imaginary character appears from behind an object disposed in the real-world space to be displayed.

Figure 2:
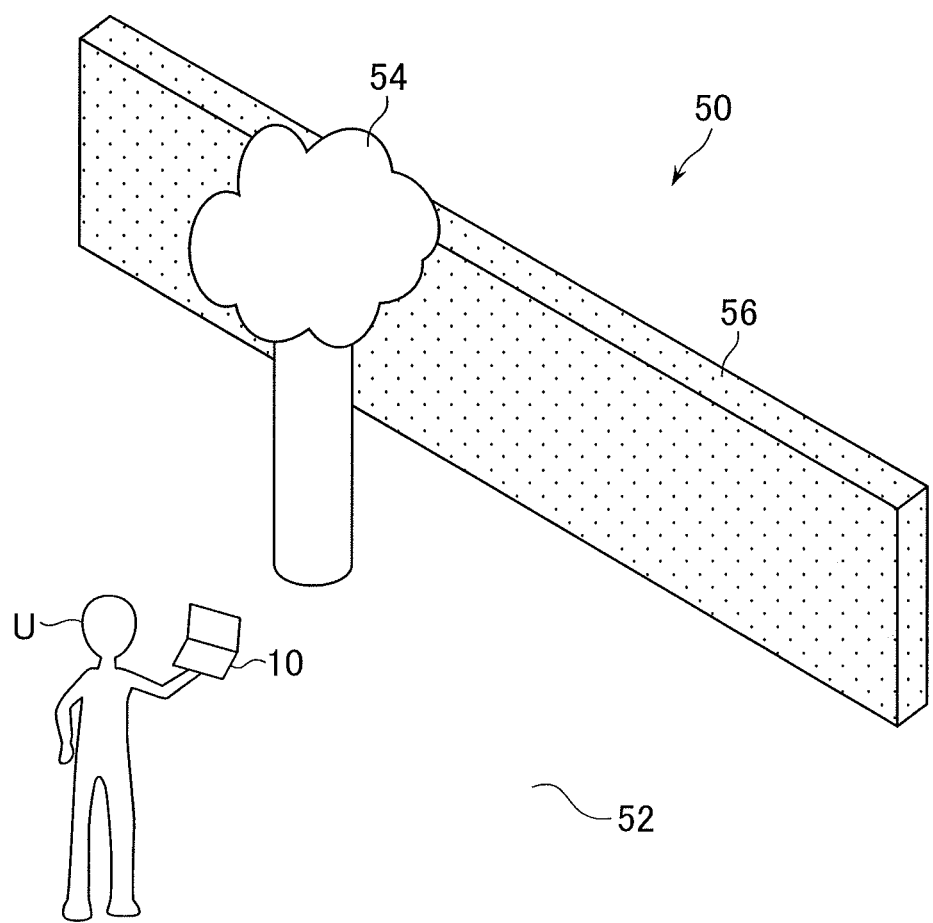
FIG. 2 A diagram illustrating a real-world space photographed by a user.

FIG. 2 is a diagram illustrating the real-world space photographed by the user. As illustrated in FIG. 2, for example, a user U grasps the game device 10 to change a photographing range of the CMOS camera 40. The CMOS camera 40 photographs a real-world space 50 in which various objects are disposed. For example, on a ground 52 of the real-world space 50, a tree 54 and a wall 56 are disposed. When the user performs a given photographing instruction operation, a photographed image is generated by the CMOS camera 40.

Figure 3:
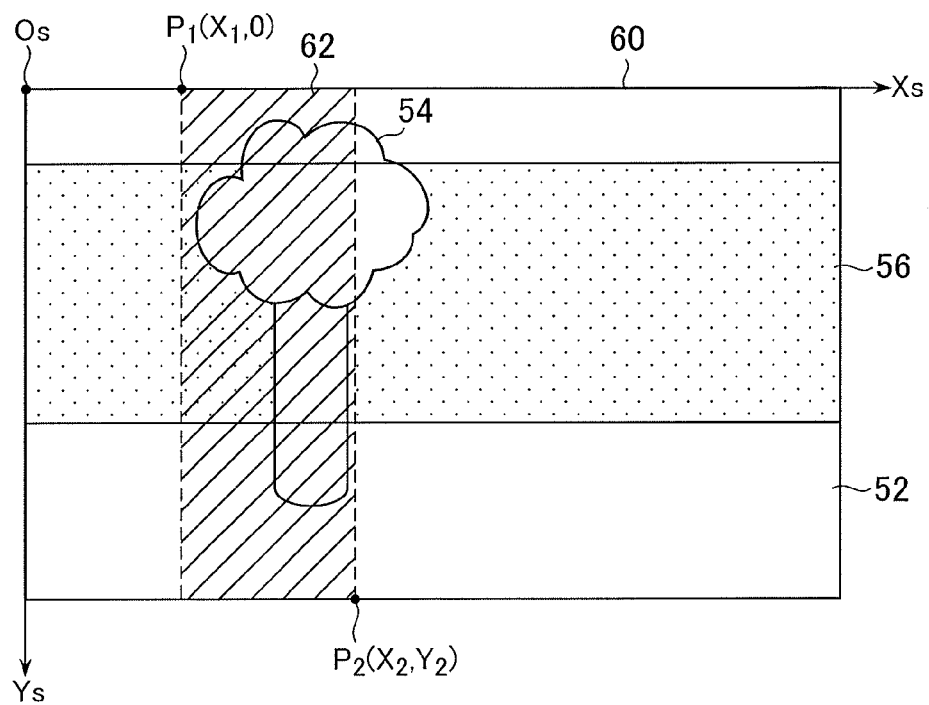
FIG. 3 A diagram illustrating a photographed image displayed on the game device.

FIG. 3 is a diagram illustrating the photographed image displayed on the game device 10. A photographed image 60 may be displayed in any one of the first liquid crystal display unit 26a and the second liquid crystal display unit 28. In this embodiment, a description is given of a case where the photographed image 60 is displayed on the second liquid crystal display unit 28. As illustrated in FIG. 3, the photographed image 60 includes the objects (for example, ground 52, tree 54, and wall 56) in the real-world space 50 included in the photographing range of the CMOS camera 40.

Further, in the photographed image 60, a target region 62 is set. The user aims to photograph the real-world space 50 so that a given object (subject) in the real-world space 50 is included in the target region 62. In other words, the target region 62 is intended to guide the user to a photographing position (display position in the photographed image 60) of the subject. In this embodiment, the user changes the photographing range of the CMOS camera 40 so that the tree 54 is photographed (located) in the target region 62.

In this embodiment, a description is given of a case where the target region 62 is rectangular. Further, in this embodiment, a description is given of a case where the target region 62 is disposed at a predetermined position between a center point of the photographed image 60 and a left end (for example, $Y_s$ axis). For example, as illustrated in FIG. 3, a region inside a rectangle with a diagonal line between a position $P_1$ $(X_1, 0)$ and a position $P_2$ $(X_2, Y_2)$ of a plane coordinate system (screen coordinate system) with an origin $O_s$ at an upper left endpoint of the photographed image 60 is set as the target region 62 (for example, $0<X_1<X_2$, $0<Y_2$).

Note that in a pre-photographing image, which is generated by the CMOS camera 40 before the photographing instruction operation by the user is performed, the image inside the target region 62 may be set to be lower in luminance than the image outside the target region 62. In other words, the object photographed inside the target region 62 and the object photographed outside the target region 62 may be displayed in different forms, to thereby guide the user to the target region 62.

As described above, in the case where the photographing range of the CMOS camera 40 is set so that the tree 54 is included in the target region 62, the user uses the touch panel 26b or the operation key unit 36 to perform a given photographing instruction operation. When the user performs the photographing instruction operation, the photographed image 60 is acquired. Then, based on the photographed image 60, a virtual space simulating the real-world space 50 is constructed in the main memory 18. In the virtual space, an object representing the object in the real-world space 50 and an object representing a composition target to be composited with the real-world space 50 are disposed.

Figure 4:
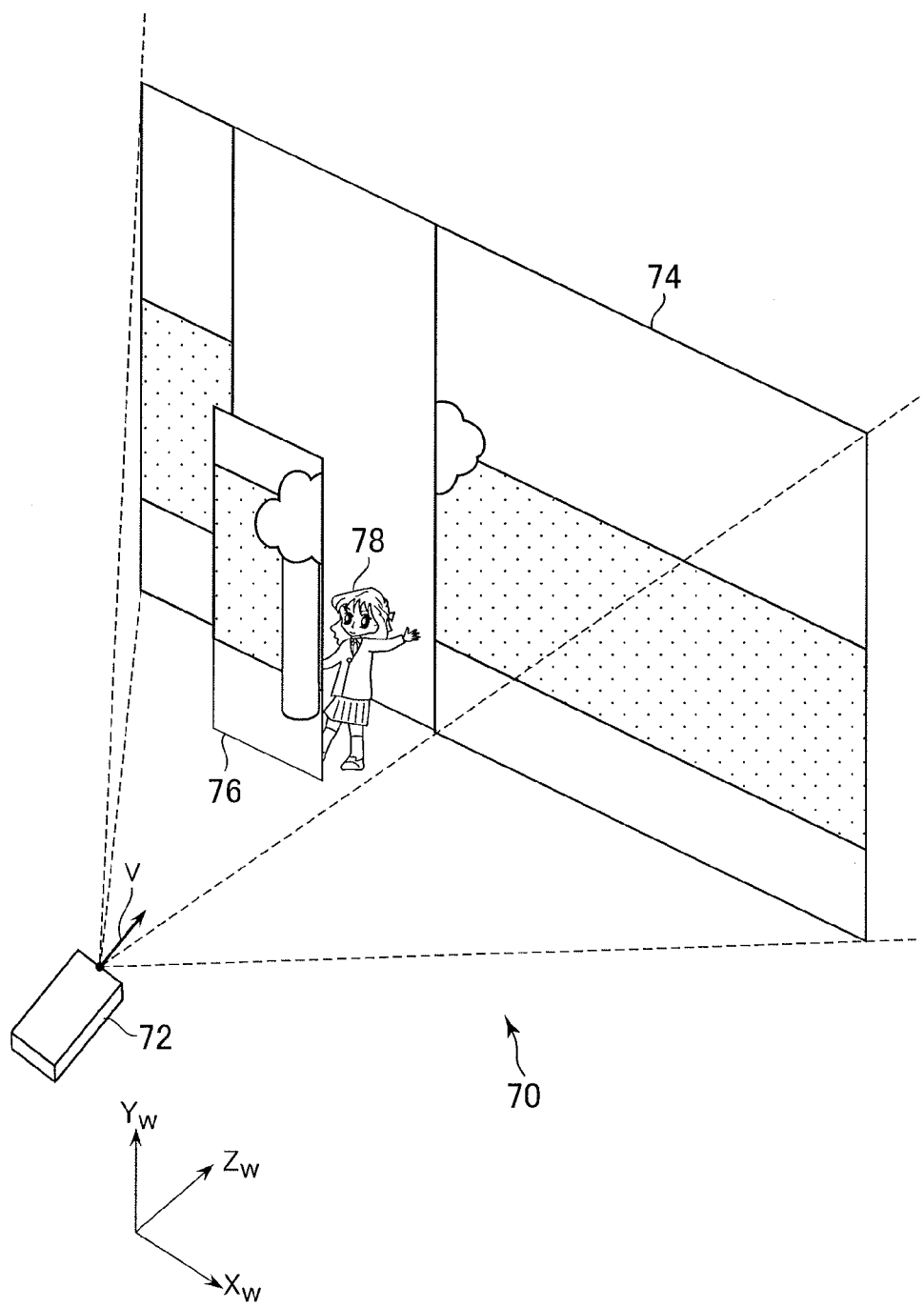
FIG. 4 A diagram illustrating an example of a virtual space constructed in a main memory.

FIG. 4 is a diagram illustrating an example of the virtual space constructed in the main memory 18. As illustrated in FIG. 4, three axes ($X_w$ axis-$Y_w$ axis-$Z_w$ axis), which are orthogonal to one another, are set in a virtual space 70. Positions of the objects and a virtual camera 72 disposed in the virtual space 70 are determined by three-dimensional coordinates.

For example, of the objects disposed in the virtual space 70, the objects in a field of view of the virtual camera 72 are displayed on the first liquid crystal display unit 26a or the second liquid crystal display unit 28. The field of view of the virtual camera 72 is determined based on the position, a sight line direction V, and an angle of view, which are set for the virtual camera 72.

In the virtual space 70, a background object 74 representing an object (hereinafter simply referred to as background) in the real-world space 50 photographed outside the target region 62, and a subject object 76 representing an object (hereinafter simply referred to as subject) in the real-world space 50 photographed inside the target region 62 are disposed. Although details are described later, the image outside the target region 62 of the photographed image 60 is drawn on a surface of the background object 74. The image inside the target region 62 of the photographed image 60 is drawn on a surface of the subject object 76.

Further, in the virtual space 70, a character 78, which is an object representing the composition target, is disposed. As illustrated in FIG. 4, the character 78 is disposed between the background object 74 and the subject object 76. For example, the tree 54 is drawn on the surface of the subject object 76 located between the character 78 and the virtual camera 72, and hence such a virtual space image that the character 78 appears from behind (the back side of) the tree 54 in the real-world space 50 is displayed.

Figure 5:
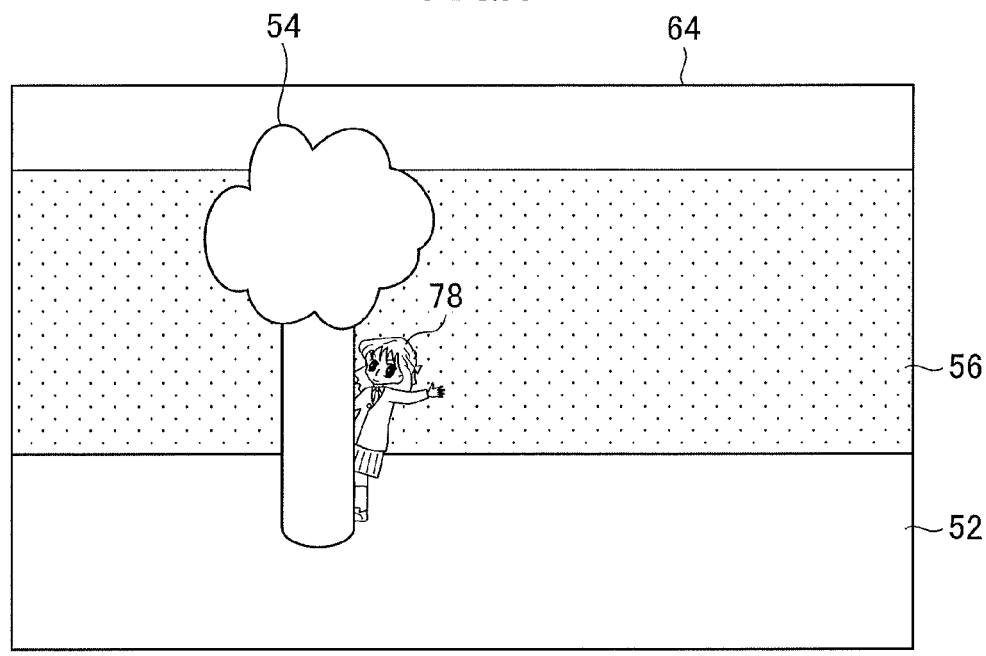
FIG. 5 A diagram illustrating an example of a virtual space image.

FIG. 5 is a diagram illustrating an example of the virtual space image. For example, in a virtual space image 64, display control is performed so that the character 78 appears from behind (the back side of) the tree 54 and comes running to the user. In other words, the display control is performed as if the character 78 is standing between the tree 54 and the wall 56 in the real-world space 50. As illustrated in FIG. 4, as viewed from the virtual camera 72, a portion of the character 78 is hidden by the subject object 76, and hence a part (for example, lower body of the character) of the character 78 that is hidden by the tree 54 is not displayed in the virtual space image 64.

As described above, the game device 10 provides realistic augmented reality to the user. Further, the game device 10 according to this embodiment is configured, for example, to make the augmented reality more realistic while reducing a processing load with simpler processing than in PTAM and the like. This technology is described in detail below.

(1-3. Functions Implemented by the Game Device)

Figure 6:
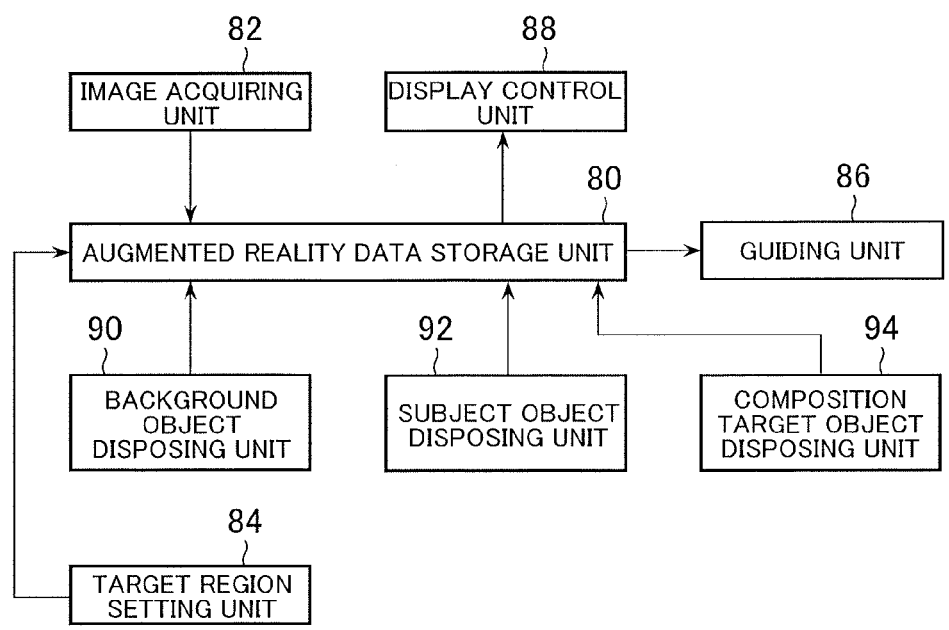
FIG. 6 A functional block diagram illustrating functions implemented by the game device.

FIG. 6 is a functional block diagram illustrating functions implemented by the game device 10. As illustrated in FIG. 6, the game device 10 includes an augmented reality data storage unit 80, an image acquiring unit 82, a target region setting unit 84, a guiding unit 86, a display control unit 88, a background object disposing unit 90, a subject object disposing unit 92, and a composition target object disposing unit 94. Those functions are implemented when, for example, the control unit 14 executes a program stored in the storage unit 16.

(1-3-1. Augmented Reality Data Storage Unit)

The augmented reality data storage unit 80 is implemented mainly by the storage unit 16 and the main memory 18. The augmented reality data storage unit 80 stores data necessary to provide the augmented reality to the user. For example, the augmented reality data storage unit 80 stores image data of the photographed image 60 acquired by the image acquiring unit 82.

Further, the augmented reality data storage unit 80 stores virtual space data representing a situation of the virtual space 70. The virtual space data stores data indicating positions and postures of the objects disposed in the virtual space 70, and data indicating settings (for example, position, sight line direction V, and angle of view) of the virtual camera 72.

Further, for example, the augmented reality data storage unit 80 stores data for identifying the target region 62 set in the photographed image 60. As the data for identifying the target region 62, information identifying the type of the target region 62 set in the photographed image 60, or information indicating the position and the shape of the target region 62, is stored.

For example, information indicating, of pixels in the photographed image 60, positions of pixels included in the target region 62 (for example, positions of the upper left pixel and the lower right pixel of the target region 62) is stored. As the target region 62, for example, any one of a plurality of target regions 62 prepared in advance is set.

Note that the control unit 14 functions as means for acquiring various types of data stored in the augmented reality data storage unit 80. The control unit 14 functions as means for changing (updating) the various types of data stored in the augmented reality data storage unit 80.

Further, the data stored in the augmented reality data storage unit 80 is not limited to the above-mentioned example. In addition, for example, motion data defining an action of the character 78, texture data representing an appearance of the character 78, data defining mapping positions of images to be mapped on the subject object 76 and the background object 74, and the like may be stored.

Alternatively, for example, the information identifying the type of the target region 62 and the information indicating the shape and the position of the target region 62 may be stored in association with each other. In this case, for example, the target region 62 specified by the user is set in the photographed image 60. For example, of the plurality of target regions 62, the target region 62 having the shape and the position associated with the target region 62 of the type specified by the user is set in the photographed image 60.

(1-3-2. Image Acquiring Unit)

The image acquiring unit 82 is implemented mainly by the control unit 14. The image acquiring unit 82 acquires the photographed image 60 of the real-world space 50 from photographing means (for example, CMOS camera 40) for photographing the real-world space 50. The image acquiring unit 82 acquires the photographed image 60 generated based on a detection signal from the CMOS camera 40.

The photographing range of the CMOS camera 40 is changed by the operation of the user. For example, the user changes the posture of the CMOS camera 40 to change the position and the sight line direction V of the CMOS camera 40, to thereby change the photographing range of the CMOS camera 40.

For example, when the photographing instruction operation is performed by the user, the image acquiring unit 82 acquires the photographed image 60 from the photographing means (for example, CMOS camera 40). In this embodiment, a description is given of a case where, when the user is guided to the target region 62 and then performs the photographing instruction operation, the image acquiring unit 82 acquires the photographed image 60 from the photographing means (for example, CMOS camera 40).

(1-3-3. Target Region Setting Unit)

The target region setting unit 84 is implemented mainly by the control unit 14. The target region setting unit 84 sets the target region 62 in the photographed image 60. The target region setting unit 84 sets the target region 62 in the photographed image 60 based on the information identifying the target region 62, which is stored in the augmented reality data storage unit 80. For example, the target region setting unit 84 sets, of the plurality of target regions 62, the target region 62 specified by the user in the photographed image 60. Information indicating the target region 62 set by the target region setting unit 84 is stored in the augmented reality data storage unit 80.

(1-3-4. Guiding Unit)

The guiding unit 86 is implemented mainly by the control unit 14 and the first liquid crystal display unit 26a or the second liquid crystal display unit 28. The guiding unit 86 causes the pre-photographing image representing the real-world space 50, which is acquired from the photographing means (for example, CMOS camera 40) before the user performs the photographing instruction operation, to be displayed on display means (for example, second liquid crystal display unit 28), and in the pre-photographing image, guides the user to the target region 62 set in the photographed image 60.

The guiding unit 86 guides the user to the target region 62 by displaying, for example, in the pre-photographing image displayed on the second liquid crystal display unit 28, the image inside the target region 62 and the image outside the target region 62 in different forms. For example, the guiding unit 86 guides the user to the target region 62 by, in the pre-photographing image, subjecting the image inside the target region 62 or the image outside the target region 62 to given effect processing.

Note that the user may be guided to the target region 62 by another method. Alternatively, for example, the guiding unit 86 may guide the user to the target region 62 by displaying a given indicator or by outputting a given sound.

(1-3-5. Display Control Unit)

The display control unit 88 is implemented mainly by the control unit 14. The display control unit 88 causes the virtual space image 64 representing the situation of the virtual space 70 as viewed from a given viewpoint (for example, virtual camera 72) to be displayed on the display means (for example, second liquid crystal display unit 28).

Figure 7:
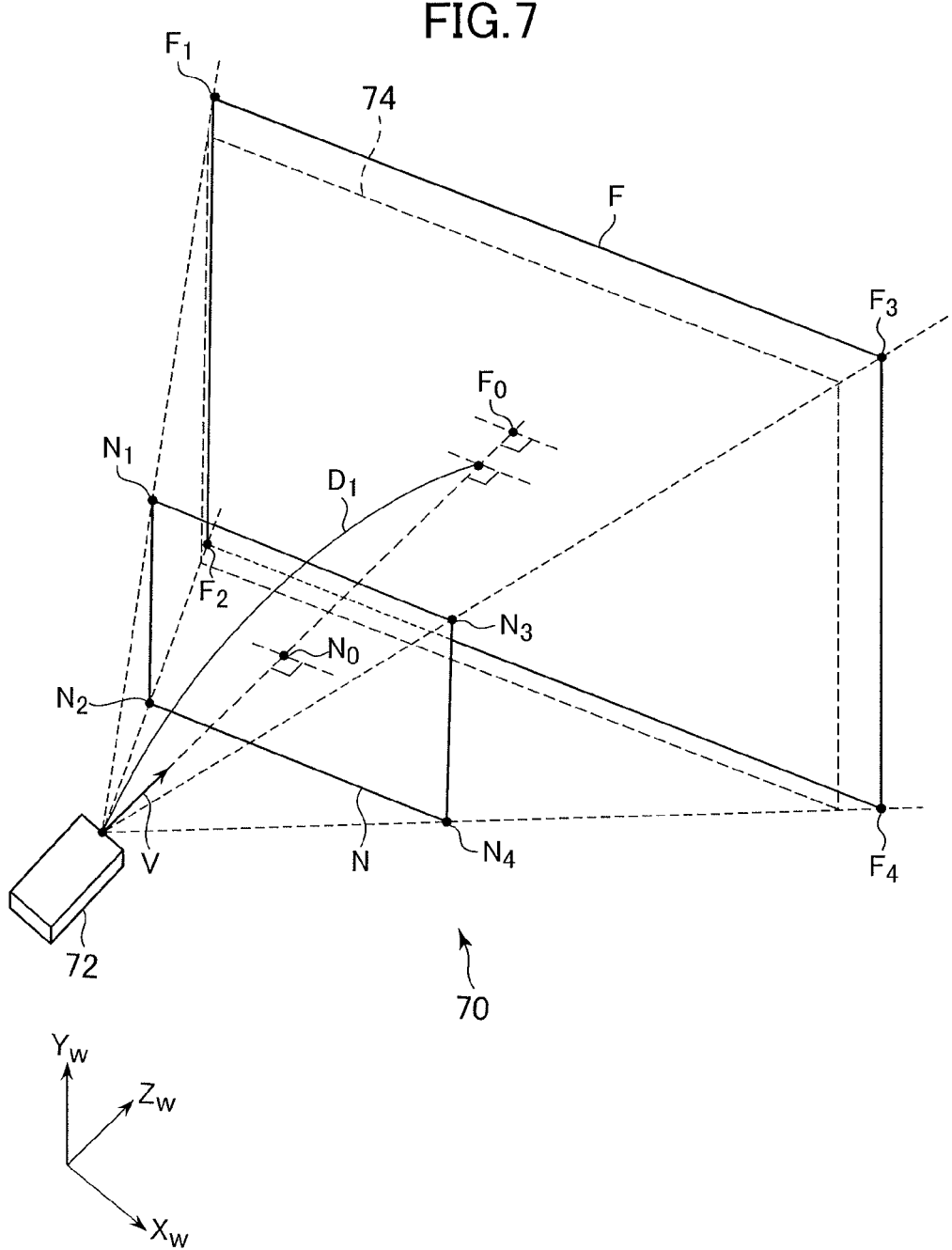
FIG. 7 A diagram for illustrating a method of displaying the virtual space image.

FIG. 7 is a diagram for illustrating a method of displaying the virtual space image 64. As illustrated in FIG. 7, of the virtual space 70, a space inside a view frustum obtained by cutting the field of view of the virtual camera 72 by a given near clip N and far clip F is displayed in the virtual space image 64. For example, the virtual space image 64 is displayed by executing given coordinate conversion processing on the objects inside the space between the near clip N and the far clip F of the field of view of the virtual camera 72.

A positional relationship between the virtual camera 72 and each of the near clip N and the far clip F is set in advance. For example, data indicating a positional relationship between the virtual camera 72 and each of a center point $N_o$ and endpoints $N_1$ to $N_4$ of the near clip N (for example, distance between the virtual camera 72 and the near clip N), and data indicating a positional relationship between the virtual camera 72 and each of a center point $F_o$ and endpoints $F_1$ to $F_4$ of the far clip F (for example, distance between the virtual camera 72 and the far clip F) are stored in advance.

(1-3-6. Background Object Disposing Unit)

The background object disposing unit 90 is implemented mainly by the control unit 14. The background object disposing unit 90 disposes the background object 74 representing the background (for example, the ground 52 and the wall 56), which is photographed outside the target region 62 of the photographed image 60, in the virtual space 70. The background object 74 is disposed at a predetermined position inside the field of view of the virtual camera 72. For example, the background object 74 is disposed so that a display position of the background object 74 in the virtual space image 64 and the position outside the target region 62 in the photographed image 60 correspond to each other.

In this embodiment, a description is given of a case where the background object 74 is generated, for example, based on a cut plane obtained by cutting the field of view of the virtual camera 72 by a plane substantially orthogonal to the sight line direction V of the virtual camera 72. For example, as illustrated in FIG. 7, the cut plane obtained by cutting the view frustum of the virtual camera 72 by a plane perpendicular to the sight line direction V of the virtual camera 72 (plane with a vertical direction in the sight line direction V) and the surface of the background object 74 substantially match.

For example, the background object 74 is disposed at the position at which a distance from the virtual camera 72 is a distance $D_1$ (for example, (distance between the virtual camera 72 and the near clip N)<(distance $D_1$)≤(distance between the virtual camera 72 and the far clip F)). For example, the surface of the background object 74 is disposed parallel to the near clip N and the far clip F.

The situation of the real-world space 50 is rendered on the surface of the background object 74 disposed as described above, based on the image (hereinafter referred to as background image 60a) outside the target region 62 of the photographed image 60.

Figure 8:
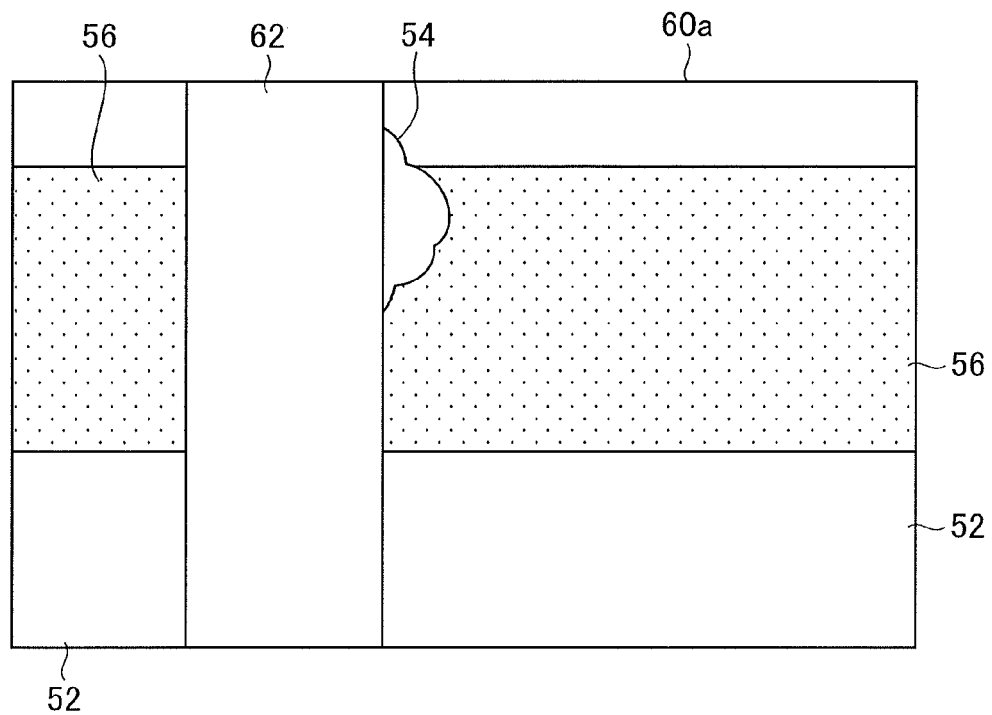
FIG. 8 A diagram illustrating an example of a background image.

FIG. 8 is a diagram illustrating an example of the background image 60a. As illustrated in FIG. 8, the background image 60a is an image of the photographed image 60 excluding the image (hereinafter referred to as subject image 60b) inside the target region 62. Stated differently, the background image 60a is a difference image between the photographed image 60 and the subject image 60b.

Points of the background object 74 are associated with points of the background image 60a, respectively, to thereby map the background image 60a on the surface of the background object 74. In other words, the background image 60a is used as a texture of the background object 74. Stated differently, the background of the real-world space 50 is rendered on the background object 74 based on the background image 60a.

As described above, the shape and the position of the background object 74 are determined so that the background object 74 is displayed in the virtual space image 64 as in the background image 60a. Stated differently, the background object 74 is disposed so that a positional relationship between the CMOS camera 40 and the background of the real-world space 50 photographed in the background image 60a, and a positional relationship between the virtual camera 72 and the background of the real-world space 50 drawn on the background object 74 correspond to each other.

(1-3-7. Subject Object Disposing Unit)

The subject object disposing unit 92 is implemented mainly by the control unit 14. The subject object disposing unit 92 is means for disposing the subject object 76 representing the subject, which is photographed inside the target region 62 of the photographed image 60, in the virtual space 70. The subject object disposing unit 92 disposes the subject object 76 between the viewpoint (for example, virtual camera 72) and the background object 74 so that the position at which the subject object 76 is displayed by being superimposed on the background object 74 in the virtual space image 64 and the position of the target region 62 in the photographed image 60 correspond to each other.

Figure 9:
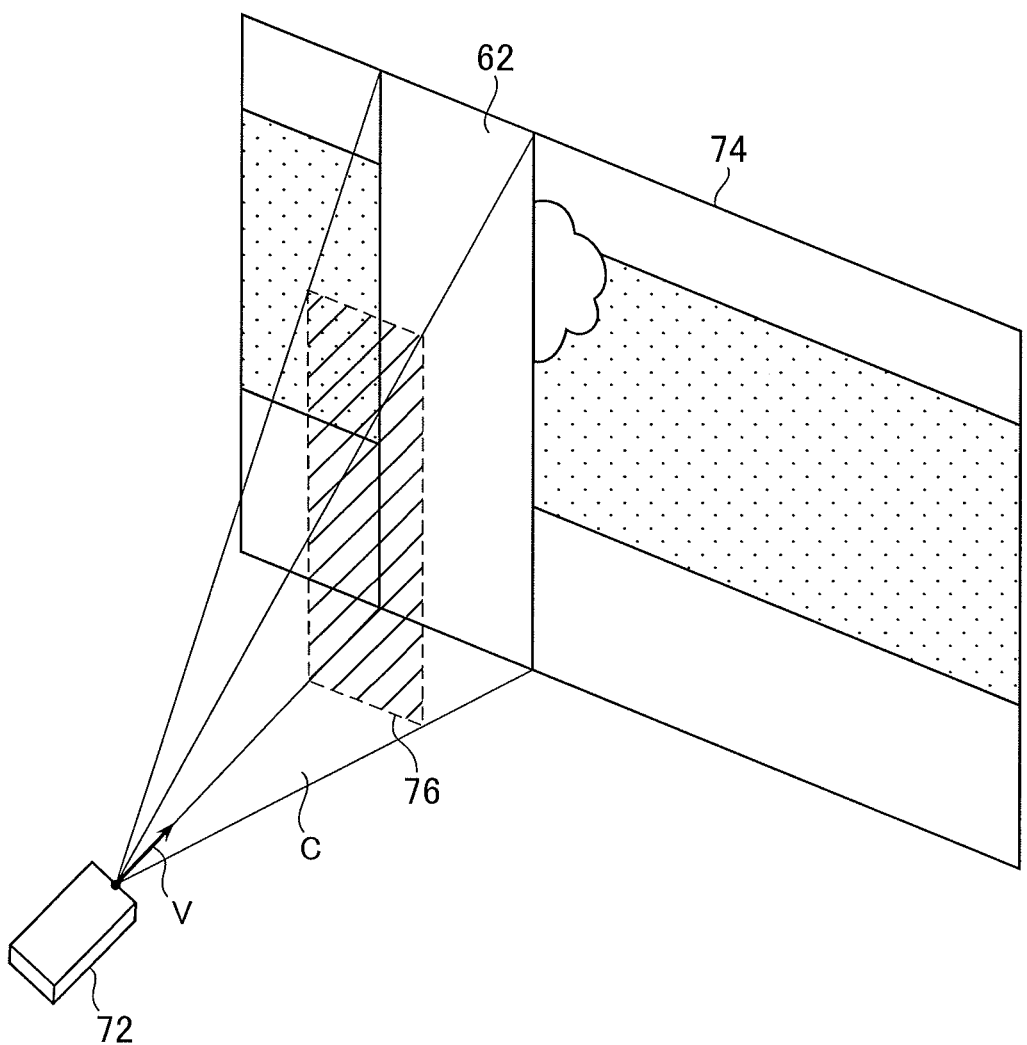
FIG. 9 A diagram for illustrating a method of disposing a subject object.

FIG. 9 is a diagram for illustrating a method of disposing the subject object 76. As illustrated in FIG. 9, the subject object 76 is generated based on, for example, the cut plane obtained by cutting a cone C with the base at the region (region on which the portion of the target region 62 is mapped) of the surface of the background object 74 that corresponds to the target region 62 of the photographed image 60 and with the vertex at the position of the virtual camera 72, on a plane substantially orthogonal to the sight line direction V of the virtual camera 72.

In other words, the shape and the position of the subject object 76 are determined so that the cut plane obtained by cutting the cone C with the base at the target region 62 when the background image 60a is mapped on the surface of the background object 74 and with the vertex at the position of the virtual camera 72 on a plane perpendicular to the sight line direction V of the virtual camera 72 (which is a plane between the near clip N and the background object 74) and the surface of the subject object 76 substantially match.

The subject object disposing unit 92 renders the situation of the real-world space 50 on the surface of the subject object 76 disposed as described above, based on the subject image 60b.

Figure 10:
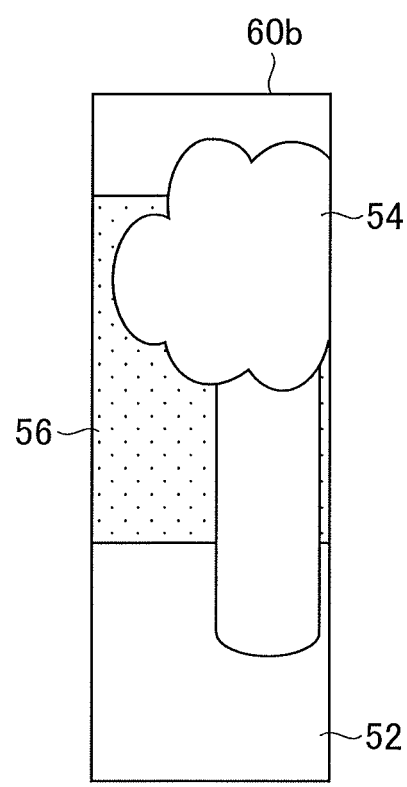
FIG. 10 A diagram illustrating an example of a subject image.

FIG. 10 is a diagram illustrating an example of the subject image 60b. As illustrated in FIG. 10, the subject image 60b is an image generated by clipping pixels of the target region 62 from the photographed image 60.

For example, the points of the subject object 76 are associated with the points of the subject image 60b, respectively, to thereby map the subject image 60b on the surface of the subject object 76. In other words, the subject image 60b is used as a texture of the subject object 76. Stated differently, the subject in the real-world space photographed inside the target region 62 is rendered on the subject object 76, based on the subject image 60b.

As described above, for example, the position of the subject object 76 is set so that a display position of the subject object 76 in the virtual space image 64 and the position of the target region 62 in the photographed image 60 correspond to each other. Stated differently, the subject object 76 is disposed so that a positional relationship between the center point of the photographed image 60 and the target region 62, and a positional relationship between a center of interest of the virtual camera 72 and the subject object 76, correspond to each other. Note that this can be paraphrased as: a positional relationship between the background object 74 and the subject object 76 corresponds to a positional relationship between the photographed image 60 and the target region 62.

(1-3-8. Composition Target Object Disposing Unit)

The composition target object disposing unit 94 disposes a composition target object (for example, character 78), which represents the composition target to be displayed in the virtual space image 64 by being composited with the real-world space 50, between the background object 74 and the subject object 76.

In this embodiment, the character 78 is disposed at the position farther than the subject object 76 from the virtual camera 72. In other words, an interval between the character 78 and the virtual camera 72 is longer than an interval between the subject object 76 and the virtual camera 72. Stated differently, the subject object 76 is disposed between the character 78 and the virtual camera 72 so that a portion of the character 78 is hidden by the subject object 76 when the character 78 is viewed from the virtual camera 72.

The character 78 performs, for example, an action defined by given motion data. For example, the character 78 moves within the virtual space 70. For example, the character 78 moves toward the virtual camera 72 or moves so as to encircle the subject object 76. In addition, for example, the character 78 may go out of the field of view of the virtual camera 72 or return to the field of view.

In the virtual space image 64, the display control unit 88 displays the composition target object (for example, character 78) to be superimposed on the background object 74 and displays the subject object 76 to be superimposed on the composition target object (for example, character 78).

The display control unit 88 performs display control of the virtual space image 64 so that the character 78 is located between the subject photographed inside the target region 62 of the photographed image 60 and the background photographed outside the target region 62 of the photographed image 60. In other words, the display control unit 88 performs the display control so that a portion of the character 78 is hidden by the subject object 76.

(1-4. Processing Executed in the Game Device)

Figure 11:
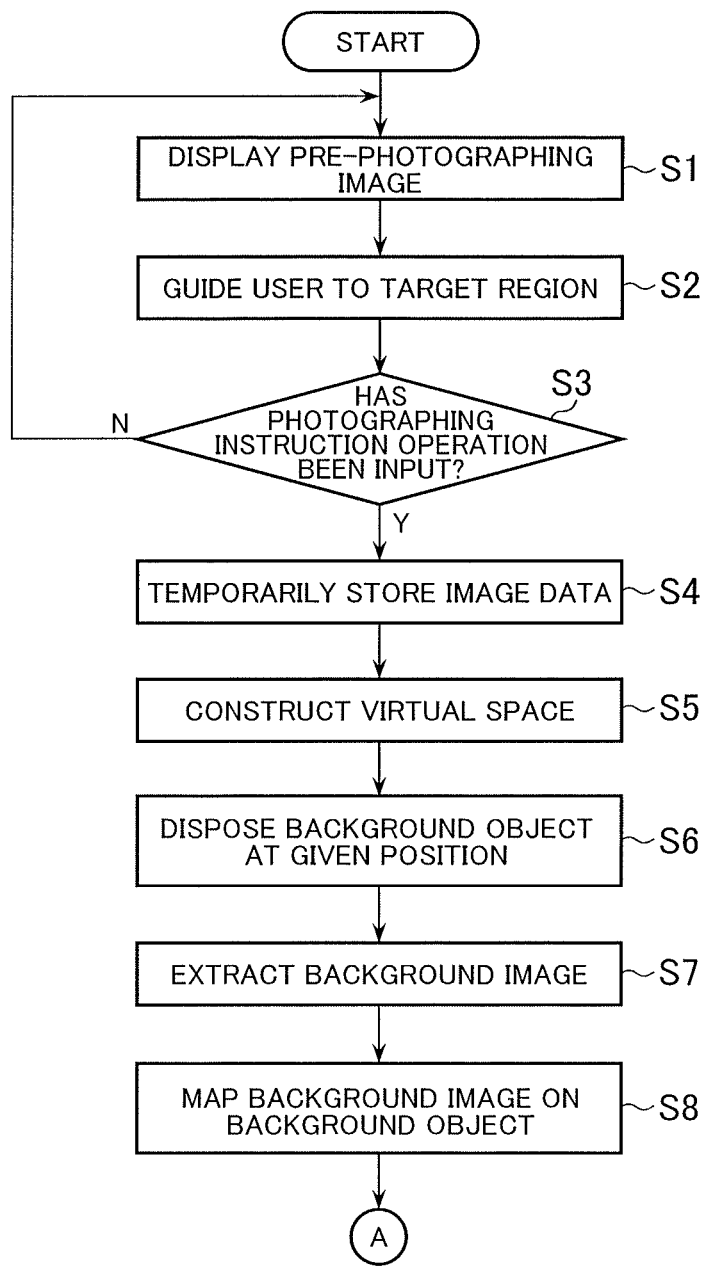
FIG. 11 A flowchart mainly illustrating processing relevant to the present invention, of processing executed by the game device.
Figure 12:
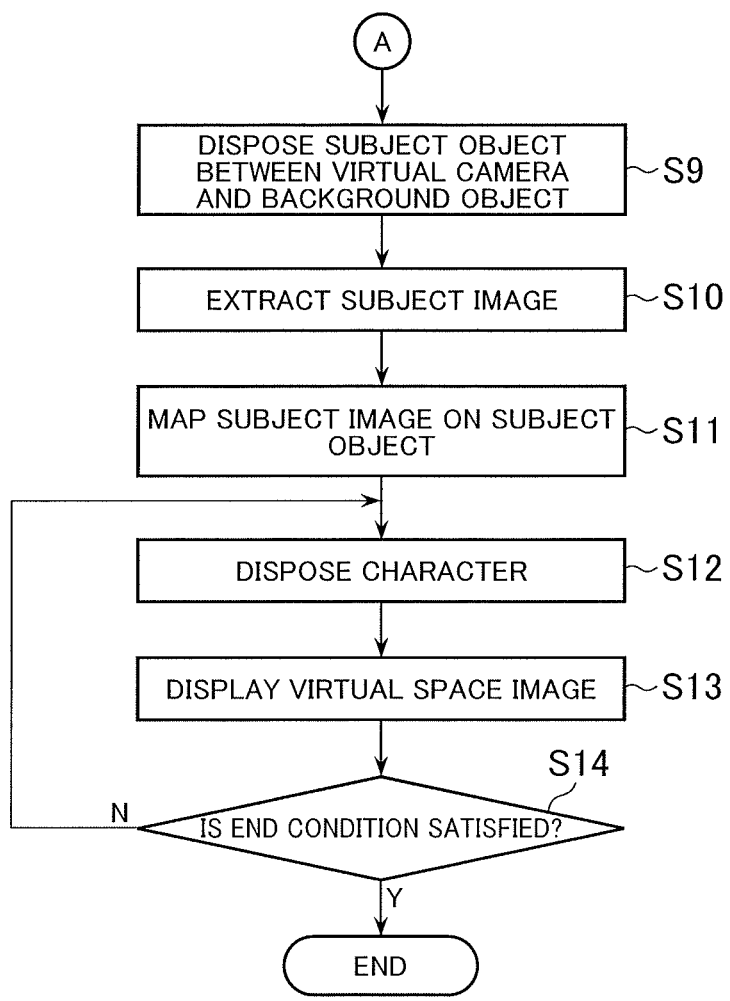
FIG. 12 A flowchart mainly illustrating the processing relevant to the present invention, of the processing executed by the game device.

Next, processing executed by the game device 10 is described. FIGS. 11 and 12 are flowcharts mainly illustrating processing relevant to the present invention, of processing executed by the game device 10. The control unit 14 executes the processing illustrated in FIGS. 11 and 12 in accordance with, for example, programs stored in the storage unit 16 and the game memory card 44. The processing illustrated in FIGS. 11 and 12 is executed when a given operation is performed by the user. For example, when a button for causing the augmented reality to be provided is selected from a menu screen (not shown), the following processing is executed.

As illustrated in FIG. 11, the control unit 14 first activates the CMOS camera 40 to cause the pre-photographing image, which is generated based on the detection signal from the CMOS camera 40, to be displayed on the second liquid crystal display unit 28 (S1). The control unit 14 guides the user to the target region 62 by referring to the data indicating the position and the shape of the target region 62 stored in the storage unit 16 or the game memory card 44, and causing, of the pre-photographing image, the pixels inside the target region 62 to be displayed with lower luminance than that of the pixels outside the target region 62 (S2). Note that the target region 62 to which the user is guided in S2 is the target region 62 set in the photographed image 60 and, for example, the user may be guided to the target region 62 that is previously specified by the user.

The control unit 14 determines whether or not the photographing instruction operation has been input from the user (S3). When the photographing instruction operation has not been input (S3; N), the processing returns to S1. In this case, the user changes the posture of the game device 10 to change the photographing range of the CMOS camera 40. For example, the user changes the photographing range so that the tree 54 is included in the target region 62.

When the photographing instruction operation has been input (S3; Y), the control unit 14 temporarily stores the image data of the photographed image 60 in the main memory 18 (S4). In other words, when the photographing instruction operation is input by the user, the image data of the photographed image 60 generated based on the detection signal from the CMOS camera 40 is stored in the main memory 18. In the photographed image 60 thus generated, the target region 62 to which the user is guided in S2 is set.

The control unit 14 constructs the virtual space 70 in the main memory 18 (S5). In S5, for example, the three axes are set, and the virtual camera 72 is disposed at a given position. Predetermined values may be set for the position, the sight line direction V, and the angle of view of the virtual camera 72.

The control unit 14 disposes the background object 74 at a given position in the field of view of the virtual camera 72 (S6). For example, the background object 74 is disposed based on the cut plane obtained by cutting the view frustum of the virtual camera 72 by a plane parallel to the near clip N and the far clip F.

The control unit 14 extracts the background image 60a outside the target region 62 from the photographed image 60 stored in the main memory 18 (S7). For example, the information indicating the position and the shape of the target region 62 is referred to, and the background image 60a outside the target region 62 is clipped from the photographed image 60. Image data representing the background image 60a extracted in S7 is temporarily stored in the main memory 18.

Note that even if the photographed image 60 is directly mapped on the background object 74, when the portion in which the target region 62 is mapped is viewed from the virtual camera 72, the portion is hidden by the subject object 76 and is not displayed. Therefore, in S7, the photographed image 60 may be directly mapped on the background object 74.

The control unit 14 maps the background image 60a extracted in S7 on the background object 74 disposed in S6 (S8). In S8, the control unit 14 maps the background image 60a by referring to the data indicating the mapping position of the background image 60a.

Referring next to FIG. 12, the control unit 14 disposes the subject object 76 between the virtual camera 72 and the background object 74 (S9). In S9, the subject object 76 is disposed based on, for example, the cut plane of the cone with the base at the target region 62 drawn on the background object 74 and with the vertex at the virtual camera 72. Stated differently, when the subject object 76 is mapped with the virtual camera 72 being the reference (light source), the subject object 76 is disposed so that the shadow of the subject object 76 appearing on the surface of the background object 74 and the target region 62 on the surface of the background object 74 substantially match.

The control unit 14 extracts the subject image 60b inside the target region 62 from the photographed image 60 stored in the main memory 18 (S10). For example, the information indicating the position and the shape of the target region 62 is referred to, and the subject image 60b inside the target region 62 is clipped from the photographed image 60. Image data representing the subject image 60b extracted in S10 is temporarily stored in the main memory 18.

The control unit 14 maps the subject image 60b extracted in S10 on the subject object 76 disposed in S9 (S11). In S11, the control unit 14 maps the subject image 60b by referring to the data indicating the mapping position of the subject image 60b.

The control unit 14 refers to the motion data to dispose the character 78 in the virtual space 70 (S12). For example, the character 78 is disposed between the subject object 76 and the background object 74. The character 78 performs a given action based on the motion data.

The control unit 14 causes the virtual space image 64 representing the situation of the virtual space 70 as viewed from the virtual camera 72 to be displayed on the second liquid crystal display unit 28 (S13). In S13, for example, display control on the virtual space image 64 is executed so that the character 78 appears from behind the tree 54.

The control unit 14 determines whether or not an end condition is satisfied (S14). The end condition may be any condition that is defined in advance for terminating the processing, and is, for example, a condition indicating whether or not the reproduction of the motion data has ended.

When the end condition is satisfied (S14; Y), the control unit 14 ends the processing. When the end condition is not satisfied (S14; N), the processing returns to S12 to continue the reproduction of the motion data.

According to the game device 10 described above, based on the target region 62 set in the photographed image 60, a virtual space image 64 may be displayed such that the imaginary character 78 freely moves in the real-world space 50, which feels more realistic to the user. For example, the user may have such a feeling that the user is playing with the character 78 in the real-world space 50.

Further, through use of the background object 74 and the subject object 76, the virtual space 70 simulating the real-world space 50 may be artificially generated. Therefore, for example, with processing contents simpler than the PTAM technology and the like, display control processing may be executed so that the character 78 appears from between the tree 54 and the wall 56.

Therefore, the realistic augmented reality may be provided to the user while a processing load of the game device 10 is reduced. Further, with the user being guided to the target region 62 before the user performs the photographing instruction operation, the user may photograph the subject in the target region 62. The user only needs to photograph the subject to be framed in the target region 62 to which the user has been guided, and hence the user can experience the augmented reality easily without requiring any special knowledge in particular.

2. Modified Examples

Note that the present invention is not limited to the embodiment described above. Changes can be appropriately made without departing from the gist of the present invention.

(1) For example, some trees 54 disposed in the real-world space 50 may be relatively thick and others may be relatively thin. Therefore, the tree 54 may be too large to be framed in the target region 62 in some cases, and the width of the target region 62 may be too large compared to the width of the tree 54 in other cases. Therefore, the shape or the position of the target region 62 may be changed by an operation of the user. For example, the user may choose the target region 62 to be set in the photographed image 60 from among the plurality of target regions 62 prepared in advance, or may perform an operation to change the shape or the position of the target region 62 set in the photographed image 60.

The game device 10 of Modified Example (1) includes means for performing, by the user, a changing instruction operation for the shape or the position of the target region 62 set in the photographed image 60. The means is implemented mainly by the touch panel 26*b* or the operation key unit 36. For example, the changing instruction operation for the target region 62 is detected by acquiring, by the control unit 14, a given operation signal. For example, the changing instruction operation for the target region 62 is an operation in which the user specifies any one of the plurality of target regions 62, or an operation in which the user provides an instruction to change the shape or the position of the currently set target region 62.

Further, the game device 10 includes means for changing, when the changing instruction operation is performed by the user, the target region 62 based on the changing instruction operation. The means is implemented mainly by the control unit 14. For example, the target region 62 specified by the user from among the plurality of target regions 62 is set in the photographed image 60, or the shape or the position of the target region 62 is changed based on the changing instruction operation by the user.

For example, the augmented reality data storage unit 80 of Modified Example (1) stores the types of the target regions 62 prepared in advance and data indicating the shapes or the positions of the target regions 62 in association with each other. Alternatively, the augmented reality data storage unit 80 stores the changing instruction operation by the user and data indicating a method of changing the shape or the position of the target region 62 in association with each other. When the changing instruction operation is performed by the user, the storage contents of the augmented reality data storage unit 80 are referred to so that the shape or the position of the target region 62 after the change is determined.

Figure 13:
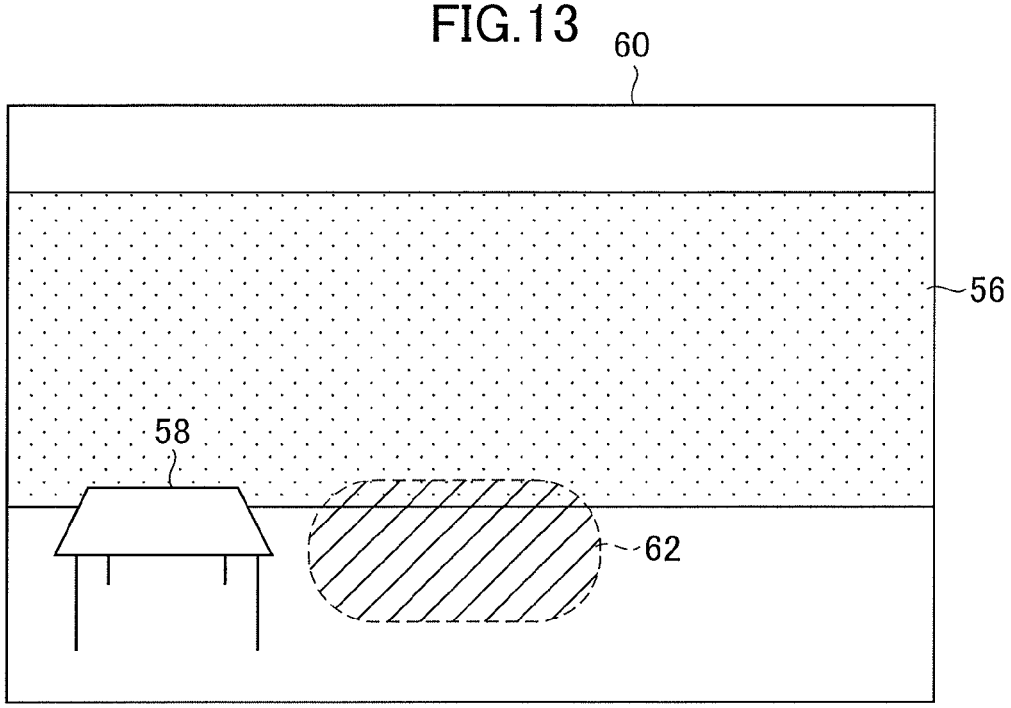
FIG. 13 A diagram illustrating a target region whose shape and position have been changed by the user.

FIG. 13 is a diagram illustrating the target region 62 whose shape and position have been changed by the user. For example, the rectangular target region 62 illustrated in FIG. 3 is changed to an elliptical target region 62 as illustrated in FIG. 13. In this state, for example, the user aims to photograph a desk 58, which is disposed in the real-world space 50, inside the target region 62. When the desk 58 is photographed inside the target region 62 by the user, the subject object 76 corresponding to the elliptical target region 62 is disposed in the virtual space 70.

The subject object disposing unit 92 of Modified Example (1) determines the shape or the position of the subject object 76 based on the changed shape or position of the target region 62. The method of setting the subject object 76 is the same as in the embodiment. In other words, the shape or the position of the subject object 76 is determined so that the shape and the position of the subject object 76 in the virtual space image 64 correspond to the shape and the position of the target region 62 in the photographed image 60. For example, the subject object 76 is set based on the cut plane obtained by cutting the cone (elliptic cone in the above-mentioned case) with the base at the target region 62 on the surface of the background object 74 and with the vertex at the virtual camera 72 in a plane perpendicular to the sight line direction V of the virtual camera 72.

Further, the composition target object disposing unit 94 of Modified Example (1) determines the position or the action of the composition target object so that the whole or a portion of the composition target object (for example, character 78) is hidden by the subject object 76 as viewed from the viewpoint (for example, virtual camera 72).

For example, the position or the action of the character 78 is determined so that the character 78 is disposed between the background object 74 and the subject object 76 as viewed from the virtual camera 72. For example, the position of the character 78 is determined so that the position of the character 78 at the start of reproduction of the motion data is between the background object 74 and the subject object 76. Further, for example, a plurality of pieces of motion data are prepared, and from the plurality of pieces of motion data, the motion data defining an action in which the position of the character 78 is between the background object 74 and the subject object 76 is extracted so that the motion data is reproduced.

According to Modified Example (1), depending on the disposing situation of the objects disposed in the real-world space 50, the user may change the target region 62. For example, when the tree 54 is thin compared to the target region 62, the width of the target region 62 may be reduced, and hence the game device 10 may provide the augmented reality optimal for the real-world space 50 to the user.

(2) Further, for example, when the character 78 is hidden by the subject object 76 as viewed from the virtual camera 72, only a portion of the hidden part may be displayed in the virtual space image 64.

Figure 14:
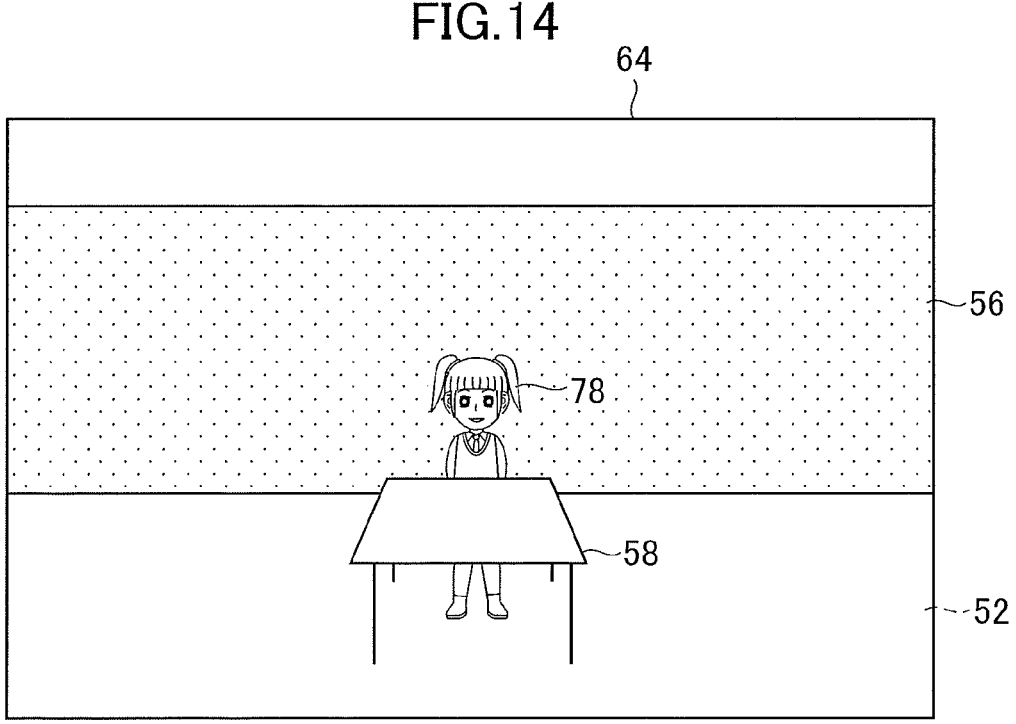
FIG. 14 A diagram illustrating an example of the virtual space image displayed in Modified Example (2).

FIG. 14 is a diagram illustrating an example of the virtual space image 64 displayed in Modified Example (2). As illustrated in FIG. 14, the virtual space image 64 is displayed so that the character 78 is sitting behind the desk 58 as viewed from the user. A portion of the character 78 (for example, torso of the character 78) that is hidden by the desk 58 is not displayed. On the other hand, a portion of the character 78 (for example, legs of the character 78) that is not hidden by the desk 58 is displayed.

In order to realize the display control as described above, the subject object 76 in Modified Example (2) is configured to include a translucent polygon. To the translucent polygon, a transmittance (so-called alpha value) is set so as to make, for example, the texture drawn on the surface transmissive.

For example, the display control unit 88 makes, of the subject object 76, the translucent polygon representing the portion photographed in a predetermined region (for example, lower half) in the target region 62 transmissive. The predetermined region of the target region 62 is a predefined portion of the target region 62 and is, for example, a region in which a service provider expects that the background will be photographed instead of the subject. For example, the predetermined region of the target region 62 is a region in which the ground 52 is expected to be photographed instead of the desk 58.

Figure 15:
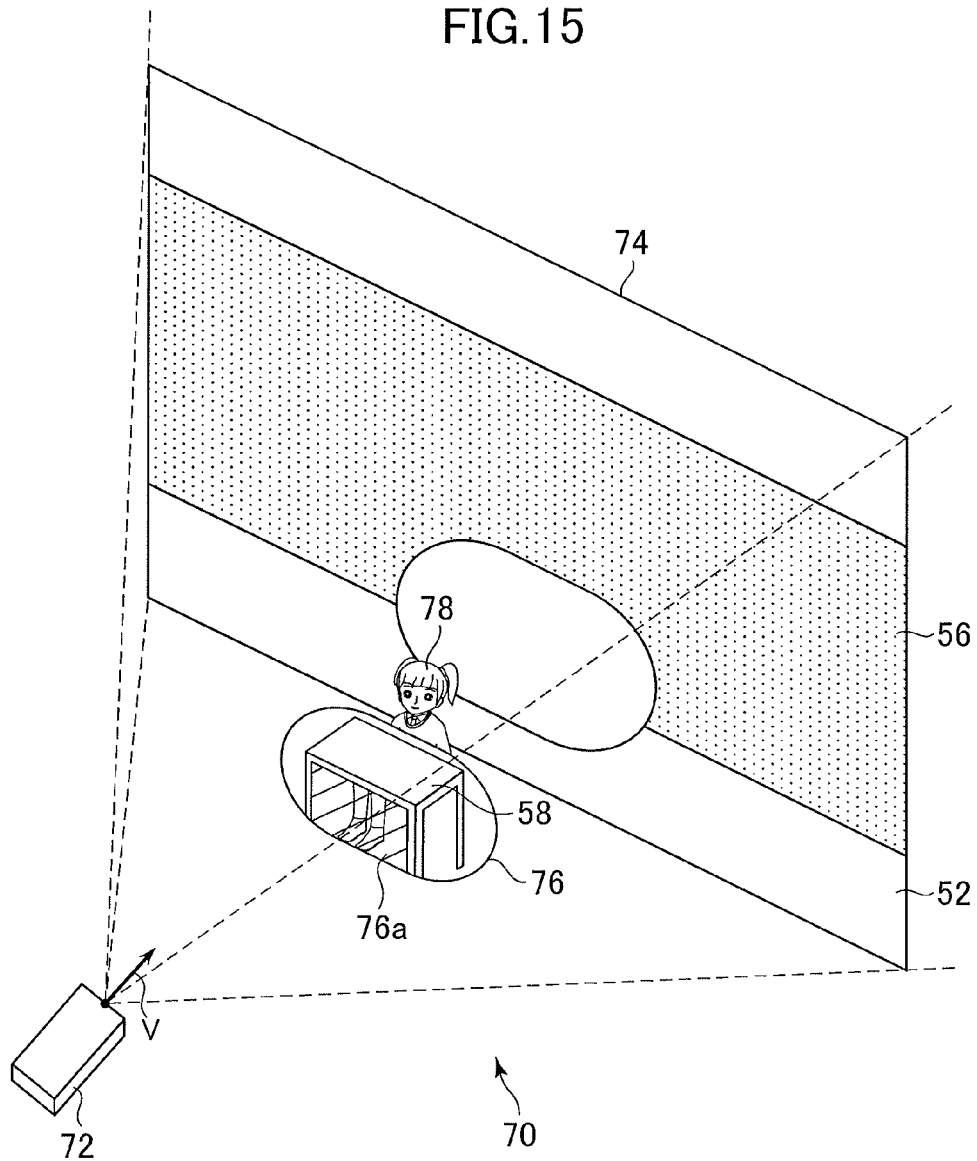
FIG. 15 A diagram illustrating a virtual space in Modified Example (2).

FIG. 15 is a diagram illustrating the virtual space 70 in Modified Example (2). For example, as illustrated in FIG. 15, the elliptical subject object 76 is disposed in the virtual space 70. The character 78 is disposed in a sitting posture. When the character 78 is viewed from the virtual camera 72, parts below the neck of the character 78 are hidden by the subject object 76. In other words, when the subject object 76 is not a translucent polygon, the subject object 76 is not transmissive, and hence the parts below the neck of the character 78 are not displayed in the virtual space image 64.

Therefore, the display control unit 88 of Modified Example (2) causes, of the composition target object (for example, character 78), a portion on which the transmissive translucent polygon is superimposed as viewed from the viewpoint (for example, virtual camera 72) to be displayed in the virtual space image 64. In the case illustrated in FIG. 15, the upper side of the elliptical subject object 76 is set so as not to be transmissive, and the lower side (hatched region 76a illustrated in FIG. 15) is set so as to be transmissive. Information indicating the transmittance set for the subject object 76 may be stored in the augmented reality data storage unit 80 in advance, or may be set based on an operation input by the user.

According to Modified Example (2), for example, as illustrated in FIG. 15, such display control that only the legs of the character 78 sitting behind the desk 58 are seen may be performed, and hence the augmented reality may be made more realistic.

(3) Further, for example, in the embodiment, the case where the rectangular target region 62 is set has been described, but as in Modified Examples (1) and (2), another target region 62 may be set in the photographed image 60. In this case, the character 78 may perform the action depending on the virtual space 70, which is generated based on the target region 62 set in the photographed image 60.

A description is given of a case where the augmented reality data storage unit 80 of Modified Example (3) stores the virtual space 70 (for example, information identifying the type, the shape, or the position of the target region 62) and the motion data defining the action of the composition target object in association with each other. In other words, the motion data is defined so that the character 78 performs different actions depending on the virtual space 70, which is generated based on the target region 62 set in the photographed image 60.

FIG. 16 is a table showing a data storage example of the motion data. As shown in FIG. 16, as the information identifying the virtual space 70, information indicating the type of the target region 62 and information indicating the position or the shape of the target region 62 are stored. Any one of the plurality of target regions 62 shown in FIG. 16 is set in the photographed image 60.

The motion data shown in FIG. 16 is data defining a temporal change in position of the character 78. For example, as the motion data, data defining a change in vertex position of the polygon of the character 78 is stored. Specifically, data indicating a change in position of a skeleton set for the character 78 and a positional relationship between the changing position of the skeleton and the changing vertex position of the polygon is stored as the motion data.

For example, the motion data associated with the virtual space 70 generated based on a vertically long target region 62 defines an action in which the character 78 comes running from behind the subject. Further, for example, the motion data associated with the virtual space 70 generated based on a horizontally long target region 62 defines an action in which the character 78 sits behind the subject.

The composition target object disposing unit 94 of Modified Example (3) causes the composition target object (for example, character 78) to act in the virtual space 70 based on the motion data associated with the virtual space 70 generated by the display control unit 88.

For example, the storage contents of the augmented reality data storage unit 80 are referred to, and the information indicating the target region 62 set in the photographed image 60 is referred to. For example, the type of the target region 62 set in the photographed image 60 is determined. Then, the character 78 in the virtual space 70 is caused to act based on the motion data associated with the virtual space 70, which is generated based on the target region 62 set in the photographed image 60. The motion data is reproduced to cause the character 78 to act in the virtual space 70.

According to Modified Example (3), the character 78 may be caused to perform the action depending on the virtual space 70. Therefore, a wide variety of augmented reality may be provided to the user.

(4) Further, for example, the user may be guided to the subject to be photographed in the target region 62. For example, the user may be guided in photographing the tree 54 in the target region 62. In this case, the character 78 may perform the action depending on the subject to be photographed in the target region 62. In other words, the action of the character 78 may be different for the case where the tree 54 is to be photographed in the target region 62 and for a case where the desk 58 is to be photographed in the target region 62.

The game device 10 of Modified Example (4) includes means for guiding the user to the subject to be photographed in the target region 62. For example, the means is realized by the guiding unit 86. The guiding unit 86 guides the user to the subject by superimposing the given indicator on the pre-photographing image. Alternatively, for example, the user may be guided to the subject by a sound. The subject to which the user is to be guided by the guiding unit 86 may change depending on the target region 62. Further, information indicating the subject to which the user is guided by the guiding unit 86 may be stored in the augmented reality data storage unit 80.

The augmented reality data storage unit 80 of Modified Example (4) stores the subject and the motion data defining the action of the composition target object in association with each other. The subject is a subject to which the user is guided, and is an object defined in advance by the service provider. The shape and the position of the target region 62 may be preset depending on the subject.

FIG. 17 is a table showing association between the subjects and the motion data. As shown in FIG. 17, information for identifying the subjects and the motion data are stored in association with each other. The user is guided to any one of the subjects defined in the data shown in FIG. 17.

The composition target object disposing unit 94 of Modified Example (4) causes the composition target object (for example, character 78) to act in the virtual space 70 based on the motion data associated with the subject to which the user is guided. For example, the composition target object disposing unit 94 refers to the storage contents of the augmented reality data storage unit 80 to determine the subject to which the user is guided by the guiding unit 86. Based on the motion data associated with the determined subject, the character 78 acts in the virtual space 70.

According to Modified Example (4), the character 78 may be caused to perform the action depending on the subject to be photographed in the target region 62.

(5) Further, for example, a plurality of target regions 62 may be set in the photographed image 60. For example, when two target regions 62 are set in the photographed image 60, subject objects 76 representing objects in the real-world space 50, which are photographed in the respective target regions 62, are disposed in the virtual space 70. In other words, a plurality of subject objects 76 are disposed in the virtual space 70.

Note that the distances between the virtual camera 72 and the plurality of subject objects 76 may be different from each other. In other words, one subject object 76 may be disposed at a position that is relatively far from the virtual camera 72, and another subject object 76 may be nearer to the virtual camera 72 than the one subject object 76.

Further, for example, when a plurality of target regions 62 are set in the photographed image 60, the character 78 may perform different actions depending on a combination of the plurality of target regions 62. In this case, for example, the combination of the target regions 62 and the motion data may be stored in association with each other. The composition target object disposing unit 94 causes the character 78 to act based on the motion data associated with the combination of the target regions 62 set in the photographed image 60.

(6) Further, for example, the user may be allowed to specify the position at which the subject object 76 is to be disposed. For example, the user may be allowed to specify the distance between the virtual camera 72 and the subject object 76. Stated differently, the user may be allowed to specify the position of the cut plane of the cone C. With this configuration, a depth of the subject disposed in the real-world space 50 (distance between the subject and the CMOS camera 40) may be specified by the user.

(7) Further, for example, the case where the character 78 acts based on the motion data has been described, but the character 78 may act in the virtual space 70 based on an operation by the user. For example, the position, the posture, and the moving direction of the character 78 may be changed based on a detection signal from the touch panel 26b or the operation key unit 36. With this configuration, the user may enjoy a situation in which the character 78 hides behind, or appears from behind, an object disposed in the real-world space 50 in response to the operation by the user.

(8) Further, for example, a given object may be generated in the virtual space 70 in response to an operation by the user. For example, when the user performs a given operation, an object representing a snowball is generated in the virtual space 70. The object moves in the virtual space 70 in response to an operation by the user. For example, a game (for example, snowball fight game) in which the user aims to bring the object into contact with the character 78 who is moving about in the virtual space 70 may be executed.

For example, when the character 78 is located between the subject object 76 and the background object 74, the object representing the snowball contacts the subject object 76. Therefore, the user may have such a feeling that the character 78 hides behind the tree 54 in the real-world space 50 to avoid the snowball thrown by the user.

(9) Further, for example, in the embodiment, the case where the photographed image 60 is a still image has been described, but the virtual space 70 may be generated based on a moving image consisting of photographed images 60 that are photographed in succession. Further, for example, the position and the posture of the CMOS camera 40 when the user performs a photographing start operation may be stored. In this case, the position and the posture of the virtual camera 72 may be controlled depending on the changes in position and posture of the CMOS camera 40 detected by the sensor unit 42.

(10) Further, for example, the case where the user is guided to the target region 62 and then performs the photographing instruction operation has been described, but the target region 62 may be set by the user after the photographed image 60 is photographed. In this case, the guiding unit 86 may not be implemented in the game device 10. For example, the user sets the target region 62 by encircling the target region 62 that the user wants to set in the photographed image 60 with a touch pen or the like.

(11) Further, for example, in the embodiment, the case where the background object 74 and the subject object 76 are dynamically generated has been described, but data defining the shape and the position of the background object 74 and the shape and the position of the subject object 76 may be stored in advance. In this case, the data is stored for each of the target regions 62. When a photographed image 60 is photographed by the user, the background object 74 and the subject object 76 are disposed in the virtual space 70 based on the data associated with the target region 62 that is set at the time of photographing.

(12) Further, the composition target object is not limited to the character 78. The composition target object may be any object that represents a composition target to be composited with the real-world space 50, and as an alternative, for example, an imaginary object (for example, imaginary rock) that does not exist in the real-world space 50 may be disposed in the virtual space 70 as the composition target object.

(13) Further, for example, the present invention may also be applied to an image processing device other than the game device 10 described in the embodiment and the modified examples. For example, when the image processing device is implemented by a mobile phone, the augmented reality may be provided to the user based on the photographed image generated by a camera included in the mobile phone.

The invention claimed is:

1. An image processing device, comprising at least one microprocessor configured to:
   acquire a photographed image of a real-world space from a photographing device that photographs the real-world space;
   cause a virtual space image representing a situation of a virtual space as viewed from a given viewpoint to be displayed on a display;
   set a target region in the photographed image;
   dispose a background object representing a background, which is photographed outside the target region of the photographed image, in the virtual space;
   dispose a subject object representing a subject, which is photographed inside the target region of the photographed image, in the virtual space, and dispose the subject object between the given viewpoint and the background object so that a position at which the subject object is displayed and superimposed on the background object in the virtual space image, and a position of the target region in the photographed image, correspond to each other; and
   dispose a composition target object, which represents a composition target displayed and combined with the real-world space in the virtual space image, between the background object and the subject object,
   wherein the at least one microprocessor, in the virtual space image, display the composition target object superimposed on the background object, and display the subject object superimposed on the composition target object.

2. The image processing device according to claim 1,
wherein the at least one microprocessor acquires the photographed image from the photographing device, in a case where a photographing instruction operation is performed by the user,
wherein the at least one microprocessor cause a pre-photographing image representing the real-world space, which is acquired from the photographing device before the photographing instruction operation is performed by the user, to be displayed on the display, and guide, in the pre-photographing image, the user to the target region set in the photographed image, and
wherein the at least one microprocessor acquire the photographed image from the photographing device in a case where the user is guided to the target region and then performs the photographing instruction operation.

3. The image processing device according to claim 1,
wherein the at least one microprocessor allow the user to perform a changing instruction operation for a shape or the position of the target region set in the photographed image,
wherein the at least one microprocessor change, in a case where the changing instruction operation is performed by the user, the shape or the position of the target region based on the changing instruction operation,
wherein the at least one microprocessor determine a shape or the position of the subject object, based on the changed shape or position of the target region, and
wherein the at least one microprocessor determine a position or an action of the composition target object so that a whole or a portion of the composition target object is hidden by the determined subject object as viewed from the given viewpoint.

4. The image processing device according to claim 1,
wherein the subject object comprises a translucent polygon,
wherein the at least one microprocessor make the translucent polygon transmissive, representing a portion of the subject object that is photographed in a predetermined region in the target region, and
wherein the at least one microprocessor cause a portion of the composition target object, on which the transmissive translucent polygon is superimposed as viewed from the given viewpoint, to be displayed in the virtual space image.

5. The image processing device according to claim 1,
wherein the at least one microprocessor acquire motion data defining an action of the composition target object from a storage that stores the virtual space and the motion data in association with each other, and
wherein the at least one microprocessor cause the composition target object to act in the virtual space, based on the motion data associated with the generated virtual space.

6. The image processing device according to claim 1,
wherein the at least one microprocessor guide the user to the subject to be photographed in the target region,
wherein the at least one microprocessor acquire motion data defining an action of the composition target object from a storage for store the subject and the motion data in association with each other, and
wherein the at least one microprocessor cause the composition target object to act in the virtual space, based on the motion data associated with the subject to which the user is guided.

7. A control method for an image processing device including at least one microprocessor, comprising:
acquiring, by the at least one microprocessor, a photographed image of a real-world space from a photographing device for photographing the real-world space;
causing, by the at least one microprocessor, a virtual space image representing a situation of a virtual space as viewed from a given viewpoint to be displayed on a display;
setting, by the at least one microprocessor, a target region in the photographed image;
disposing, by the at least one microprocessor, a background object representing a background, which is photographed outside the target region of the photographed image, in the virtual space;
disposing, by the at least one microprocessor, a subject object representing a subject, which is photographed inside the target region of the photographed image, in the virtual space, and disposing the subject object between the given viewpoint and the background object so that a position at which the subject object is displayed and superimposed on the background object in the virtual space image, and a position of the target region in the photographed image, correspond to each other; and
disposing, by the at least one microprocessor, a composition target object, which represents a composition target displayed and combined with the real-world space in the virtual space image, between the background object and the subject object,
wherein displaying, by the at least one microprocessor, in the virtual space image, displaying the composition target object superimposed on the background object, and displaying the subject object superimposed on the composition target object.

8. A non-transitory computer readable information storage medium having a program recorded thereon, the program causing a computer to function as an image processing device, the image processing device comprising:
a image acquiring unit that acquires a photographed image of a real-world space from a photographing device for photographing the real-world space;
a display control unit that causes a virtual space image representing a situation of a virtual space as viewed from a given viewpoint to be displayed on a display;
a target region setting unit that set a target region in the photographed image;
a background object disposing unit that disposes a background object representing a background, which is photographed outside the target region of the photographed image, in the virtual space;
a subject object disposing unit that disposes a subject object representing a subject, which is photographed inside the target region of the photographed image, in the virtual space, the subject object disposing unit disposing the subject object between the given viewpoint and the background object so that a position at which the subject object is displayed and superimposed on the background object in the virtual space image, and a position of the target region in the photographed image, correspond to each other; and
a composition target object disposing unit that disposes a composition target object, which represents a composition target displayed and combined with the real-world space in the virtual space image, between the background object and the subject object,
wherein, in the virtual space image, the display control unit displays the composition target object superimposed on the background object, and displays the subject object superimposed on the composition target object.

9. An image processing device, comprising:

image acquiring means for acquiring a photographed image of a real-world space from photographing means for photographing the real-world space;

display control means for causing a virtual space image representing a situation of a virtual space as viewed from a given viewpoint to be displayed on display means;

target region setting means for setting a target region in the photographed image;

background object disposing means for disposing a background object representing a background, which is photographed outside the target region of the photographed image, in the virtual space;

subject object disposing means for disposing a subject object representing a subject, which is photographed inside the target region of the photographed image, in the virtual space, the subject object disposing means disposing the subject object between the given viewpoint and the background object so that a position at which the subject object is displayed and superimposed on the background object in the virtual space image, and a position of the target region in the photographed image, correspond to each other; and composition target object disposing means for disposing a composition target object, which represents a composition target displayed and combined with the real-world space in the virtual space image, between the background object and the subject object, wherein, in the virtual space image, the display control means displays the composition target object superimposed on the background object, and displays the subject object superimposed on the composition target object.

10. An image processing device, comprising:

a image acquiring unit that acquires a photographed image of a real-world space from a photographing device for photographing the real-world space;

a display control unit that causes a virtual space image representing a situation of a virtual space as viewed from a given viewpoint to be displayed on a display;

a target region unit that sets a target region in the photographed image;

a background object disposing unit that disposes a background object representing a background, which is photographed outside the target region of the photographed image, in the virtual space;

a subject object disposing unit that disposes a subject object representing a subject, which is photographed inside the target region of the photographed image, in the virtual space, the subject object disposing unit disposing the subject object between the given viewpoint and the background object so that a position at which the subject object is displayed and superimposed on the background object in the virtual space image, and a position of the target region in the photographed image, correspond to each other; and a composition target object disposing unit that disposes a composition target object, which represents a composition target displayed and combined with the real-world space in the virtual space image, between the background object and the subject object, wherein, in the virtual space image, the display control unit displays the composition target object superimposed on the background object, and displays the subject object superimposed on the composition target object.

* * * * *